(12) United States Patent
McKinney et al.

(10) Patent No.: US 12,394,787 B2
(45) Date of Patent: Aug. 19, 2025

(54) DISPERSION OF COAL TAR PITCH FOR COATING GRAPHITIC MATERIALS AND USE IN LI-ION BATTERY ELECTRODE PRODUCTION

(71) Applicant: Koppers Delaware, Inc., Pittsburgh, PA (US)

(72) Inventors: Stacey McKinney, Ellwood City, PA (US); Jun Zhang, Peachtree City, GA (US); Billy Jay Cairns, Monaca, PA (US); Peter Tham, Morrow, GA (US); Carl Camille Mueller, Gibsonia, PA (US); Kevin J. Costanzo, Pittsburgh, PA (US); Brian R. Jones, Richmond (GB); Daniel P. Gray, Pittsburgh, PA (US)

(73) Assignee: KOPPERS DELAWARE, INC., Pittsburgh, PA (US)

(*) Notice: Subject to any disclaimer, the term of this patent is extended or adjusted under 35 U.S.C. 154(b) by 261 days.

(21) Appl. No.: 17/940,725

(22) Filed: Sep. 8, 2022

(65) Prior Publication Data
US 2023/0080961 A1   Mar. 16, 2023

Related U.S. Application Data

(60) Provisional application No. 63/241,716, filed on Sep. 8, 2021.

(51) Int. Cl.
*H01M 4/36* (2006.01)
*C01B 32/21* (2017.01)
(Continued)

(52) U.S. Cl.
CPC ............. *H01M 4/366* (2013.01); *C01B 32/21* (2017.08); *C09D 7/20* (2018.01); *C09D 7/45* (2018.01);
(Continued)

(58) Field of Classification Search
CPC ........ H01M 4/366; H01M 4/583; H01M 4/62; H01M 2004/021; H01M 10/0525;
(Continued)

(56) References Cited

U.S. PATENT DOCUMENTS

| 3,096,292 A | 7/1963 | Mertens |
| 2014/0255292 A1 | 9/2014 | Wakizaka et al. |
| 2019/0393553 A1 | 12/2019 | Tokuda et al. |

FOREIGN PATENT DOCUMENTS

| CN | 1955266 A | * 5/2007 |
| CN | 104559955 A | 4/2015 |

(Continued)

OTHER PUBLICATIONS

English Translation of CN1955266 (Year: 2006).*
(Continued)

*Primary Examiner* — Andrew J. Oyer
(74) *Attorney, Agent, or Firm* — K&L Gates LLP

(57) ABSTRACT

A dispersion, methods of making the same, applications of the dispersion to graphitic material and the resulting coated particles are disclosed. The dispersion includes ≤55% wt. coal tar pitch (softening point 100° C.-95° C.), ≤60% wt. dispersant, and the balance a non-aromatic solvent such as water or alcohol. Pitch particles in the dispersion are preferably ≤10 μm with a distribution of D50<15 μm. The pitch particles are micronized, such as by dry and/or wet milling with the dispersant and aqueous solvent to achieve the desired pitch particle size and distribution. This aqueous dispersion may be mixed with natural or synthetic graphitic material having a diameter of 5-20 μm in a ratio of 5%-30% pitch to graphite, dried and carbonized to form coated particles having a graphitic core at least partially coated by pitch particles.

40 Claims, 13 Drawing Sheets

(51) Int. Cl.
    *C09D 7/20*       (2018.01)
    *C09D 7/45*       (2018.01)
    *C09D 7/80*       (2018.01)
    *C09D 195/00*     (2006.01)
    *C10C 3/16*       (2006.01)
    *H01M 4/02*      (2006.01)
    *H01M 4/583*     (2010.01)
    *H01M 4/587*     (2010.01)
    *H01M 4/62*      (2006.01)
    *H01M 10/42*     (2006.01)

(52) U.S. Cl.
    CPC ........... *C09D 7/80* (2018.01); *C09D 195/005* (2013.01); *C10C 3/16* (2013.01); *H01M 4/583* (2013.01); *H01M 4/587* (2013.01); *H01M 4/62* (2013.01); *H01M 10/4235* (2013.01); *C01P 2004/03* (2013.01); *C01P 2004/32* (2013.01); *C01P 2004/61* (2013.01); *C01P 2004/84* (2013.01); *C01P 2006/11* (2013.01); *C01P 2006/12* (2013.01); *C01P 2006/40* (2013.01); *H01M 2004/021* (2013.01); *H01M 2004/027* (2013.01)

(58) Field of Classification Search
    CPC .. H01M 4/0471; H01M 4/1393; H01M 4/587; H01M 2004/027; C01B 32/21; C01B 32/05; C09D 7/20; C09D 7/45; C09D 7/80; C09D 195/005; C01P 2004/32; C01P 2004/61; C01P 2004/84; C01P 2006/12; C01P 2006/40; C01P 2004/03; C01P 2004/30; C01P 2006/11; Y02E 60/10
See application file for complete search history.

(56) References Cited

FOREIGN PATENT DOCUMENTS

| | | |
|---|---|---|
| CN | 105024043 A | 11/2015 |
| CN | 105470474 A | 4/2016 |
| CN | 106556583 A | 4/2017 |
| CN | 107785560 A | 3/2018 |
| CN | 111849355 A | 10/2020 |
| GB | 1434824 A | 5/1976 |
| TW | 201320450 A | 5/2013 |
| TW | 201640726 A | 11/2016 |
| WO | 2021068793 A1 | 4/2021 |

OTHER PUBLICATIONS

Pender. "Electrode Degradation in Lithium-Ion Batteries" 1243-1295. ACS Nano. Online. Jan. 2, 2020; vol. 14; pp. 1243-1295; [Retrieved on Nov. 17, 2022]. Retrieved from the internet: <url: https://pubs.acs.org/doi/10.1021/acsnano.9b04365,...; p. 1262, middle; DOI:10.1021.

International Searching Authority; International Search Report and Written Opinion of the International Searching Authority; International Application No. PCT/US22/42919; Patent Cooperation Treaty; pp. 1-16; publisher United States International Searching Authority, Published Alexandria, Virginia, US; copyright and mailing date Jan. 20, 2023; copy enclosed (16 pages).

International Searching Authority; International Search Report and Written Opinion of the International Searching Authority; International Application No. PCT/US22/42919; Patent Cooperation Treaty; pp. 1-16; publisher United States International Searching Authority, Published Alexandria, Virginia, US; copyright and mailing date Feb. 6, 2023; copy enclosed (16 pages).

\* cited by examiner

DISPERSION OF COAL TAR PITCH FOR COATING GRAPHITIC MATERIALS AND USE IN LI-ION BATTERY ELECTRODE PRODUCTION

CLAIM OF PRIORITY

The present application claims the benefit of U.S. Provisional Patent Application No. 63/241,716 filed Sep. 8, 2021, the contents of which are incorporated by reference in its entirety.

BACKGROUND OF THE INVENTION

Field of the Invention

The invention relates to improvements in coal tar pitch dispersions and methods of manufacture and application that can have wide-ranging industrial applications. More particularly, the invention relates to the making of a coal tar pitch dispersion utilizing a non-aromatic component and the use of that dispersion to coat graphite particles for possible use in lithium-ion ("Li-ion") battery electrodes. Coating graphite with this dispersion can improve Li-ion battery performance and enable the use of an environmentally friendly aqueous or aliphatic organic solution.

Description of the Prior Art

Coal tar is a complex mixture of approximately 10,000 primarily aromatic and semi-aromatic compounds that generally boil at temperatures ranging from 50° C. to more than 550° C., such as but not limited to benzene, toluene, xylene, indene, phenol, naphthalene, benzothiophene, quinoline, methyl naphthalene, acenaphthene, fluorene, phenanthrene, anthracene, carbazole, fluoranthene, pyrene, tetracene, triphenylene, chrysene, benzo(a)pyrene ("BaP"), coronene and benzo(ghi)perylene. A significant fraction of the distilled coal tar material is coal tar pitch residue. This material is utilized in the production of anodes for aluminum smelting, as well as electrodes for electric arc furnaces used in the steel industry. In evaluating the qualitative characteristics of coal tar pitch, the industry focuses on the ability of the coal tar pitch material to provide a suitable binder for use in the anode and electrode production processes. Various characteristics such as softening point, specific gravity, quinoline insolubility percentage and coking value have all served to characterize coal tar pitches for applicability in these various manufacturing processes and industries.

A Li-ion battery is a type of rechargeable battery popular in electric vehicles, portable electronics, and in military and aerospace applications. These batteries have become increasingly popular in recent years, leading to much research on extending battery lifetime, improving safety, improving performance, and producing batteries in an environmentally friendly way. During discharge of the battery, lithium ions move through an electrolyte solution from the negative electrode to the positive electrode. This reaction lowers the chemical potential energy stored in the cell and transfers that energy in an electric current away from the battery to be used by a consumer. When the battery is charged, electric energy from an external circuit moves the ions from the positive electrode to the negative electrode. This electric energy is stored in the battery as chemical potential energy, allowing the battery to be used again.

Graphite is commonly used as a carbon material for the negative electrode, or anode, in Li-ion batteries. The graphite used for these anodes is generally made by processing graphite into spherical micropowders and compressing it to form an electrode. Graphite anodes suffer structural damage during prolonged use from age and repeated discharging cycles, particularly with the first discharge. Such degradation observably reduces the capacity and power delivery of the battery. Notably, a solid-electrolyte interphase ("SEI") layer forms during the first charge cycle of the cell, resulting in lost capacity but otherwise stopping further reaction of the electrolyte. The thickness of this layer increases as the battery ages, mostly on the graphite electrode. The SEI will grow even if the battery is not used. Coulombic efficiency, the ratio of the discharge capacity to charge capacity of the battery in the same cycle, in the first charging cycle of Li-ion batteries is less than desired. This is a result of the formation of the SEI layer along with other undesirable byproducts of use which lower the capacity of the battery.

The function and integrity of graphite electrodes can be improved with carbon coatings. These coatings improve the stability and efficiency of graphite as an anode, improve the cycle performance of the battery, and prevent degradation upon discharge. The coating may consist of petroleum or coal tar pitch; light, medium and heavy tar oils; naphthalene oil, anthracene oil; carbon black; amorphous carbon; and other carbonaceous materials. These materials can be deposited onto the graphite by vapor deposition and/or high-temperature carbonization. This coating process is preferably done by dissolving the pitch in an organic solvent, creating a dispersion, and adding graphite to the resulting solution. Because these carbonaceous materials include a high number of aromatic compounds that are not miscible with water or other polar or aliphatic solvents, aromatic organic solvents provide easy dissolution for transfer and coating. It also allows use of more economical pitch with a lower softening point, when compared with methods of mechanically fusing the pitch to the graphite. However, the use of aromatic organic solvent in this process is not desirable as aromatic organic solvents are generally less safe and less environmentally friendly. As a result, they often must be separated from the coated particles, captured and stored for later reuse, adding additional steps and cost to the production of coated particles. The use of an aqueous or non-aromatic aliphatic solvent instead of aromatic organic solvents in pitch dispersions would be beneficial but graphite and pitch both have a high degree of aromaticity and so do not dissolve in, or even disperse easily, in such solutions.

Some have arrived at solutions to overcome the issue of creating a pitch dispersion in an aqueous or similar solutions. For instance, many have used a surfactant or other compounds to assist in dispersing the pitch. Chinese Patent No. 103936452 creates a pitch dispersion to form carbon fibers by dispersing mesophase or binder pitch in 0.5-5% by weight of water containing dispersant or surfactant and stirring until a dispersion is obtained. Chinese Patent No. 101857396 creates a pitch dispersion using 75-95% asphalt and 0.05-2% surfactant, keeping the temperature of the dispersion below 100° C. while adding the asphalt. Korean Patent No. 10-1400507 creates a dispersion of carbon fibers made from coal tar pitch. The fibers are fed into a hopper with deionized water, alcohol, and ethylene glycol, and homogenized by spinning at 500-3000 rpm. Japanese Patent No. 6687531 creates its dispersion with the assistance of an amphipathic organic compound, but a polar solvent is present during the dispersion step. Chinese Patent No. 103435820 relates to applying pitch to spherical graphite wherein crushed pitch, made into a fine flake structure, is added to water and surfactant and mixed into a suspension.

Some solutions involve additional chemicals or reagents in the mixture to alter the pitch and make it more amenable to this process. Chinese Patent No. 102351163 relates to creating a pitch dispersion by first treating the pitch with acid to dissolve it in an organic solvent. The mixture is then stirred, the organic and inorganic layers are separated, and undissolved pitch in the organic layer is subjected to the process again; the process is repeated 3-5 times. United States Patent No. 8,808,609 to Kitano, et al., uses a pitch dispersion to make a carbon fiber fabric. Their dispersion contains resin and hard or mesophase pitch; the melting point of the mesophase pitch being between 250° C. and 400° C. The dispersion liquid contains boron or silicon compounds acting as a graphitization promoter and a dispersant which is a surfactant or polymer. European Patent No. 3 131 848 discloses the addition of an amphiphilic organic compound, such as sulfated lignin or a lignosulfonate salt, to carbonaceous particles in a polar solvent to created coated particles for subsequent carbonization and use as an electrode in batteries. The amphiphilic organic compound both stabilizes the carbon particles in the polar solvent and acts as a carbon source for surface coating during carbonization. Chinese Patent No. 105580814 uses high-speed shearing to combine coal tar pitch and water; additionally present are wetting agent, emulsifier, defoamer, and epoxy resin. Chinese Patent No 111849355 also uses epoxy resin when mixing pitch with water, the epoxy resin is said to help polarize the pitch.

"De-agglomeration and homogenisation of nanoparticles in coal tar pitch-based carbon materials" by Gubernat, et al., J. Nanopart. Res. (2016) 18:56, identifies sonification to remedy the agglomeration of small particles in dispersing carbon particles in pitch in water or ethanol.

Despite these efforts, there is still room for improvement as the prior art solutions have not completely solved the problem of economically creating a coal tar pitch dispersion at commercial quantities and under industrial conditions without the use of aromatic organic solvent. What remains unknown in the art, therefore, is an alternate method for creating a pitch dispersion that avoids chemical alteration of the pitch or the use of additional surfactants and aromatic organic solvents. Critical limitations on the application of the prior art include necessary surfactants or dispersants, low temperature limitations, chemical alteration of the pitch, tedious procedures for extracting the pitch dispersion, and other methods that complicate the process.

SUMMARY

A dispersion of coal tar pitch is disclosed, as well as methods of making such dispersion, applications of such dispersion to graphitic materials, and the resulting coated graphitic particles. Such coated particles may be used to form negative electrodes for Li-ion batteries. Coating the graphitic particles which make up the electrode of the battery protects the electrode from contamination and premature decay upon discharge and use of the battery, thus extending the life of the battery. It may also improve the efficiency of such batteries as well. Coal tar pitch is highly aromatic in chemical composition so it will not readily react with the electrolyte solution of the battery, and thus can form an effective protective barrier for the graphite from contamination and degradation. Coal tar pitch is also not electrically active so protects the electrode from premature chemical or thermal degradation.

Notably, the coal tar pitch coating is applied to graphite particles by an aqueous dispersion, rather than using aromatic organic solvents as is common. Despite the fact that coal tar pitch is not soluble in aqueous or polar solvents, the use of an aqueous or other non-aromatic solvent has many advantages, including being more environmentally friendly than aromatic organic solvents. Non-aromatic solvents are also easier to remove from the coated particles once a liquid phase is no longer needed, by simply heating. Such solvents have lower boiling points than aromatic organic solvents, thus requiring less heat to remove. They also do not have to be captured for re-use, which reduces time and costs for separation and storage of the solvent.

The present invention is an advance over the prior art which uses aqueous, non-aromatic and/or aliphatic solvents for dispersions primarily with respect to the particular softening point of the coal tar pitch used, the amount of coal tar pitch used in the dispersion, the amount of dispersant used in the dispersion, and the ratio of coal tar pitch to graphitic material in coating the graphitic material, among other parameters.

A first aspect of the present invention is an aqueous dispersion of coal tar pitch. This dispersion, also referred to herein as a slurry, comprises an amount of coal tar pitch, preferably 55% by weight of the composition or less; an amount of dispersant, such as 60% by weight of the composition or less, preferably 15% by weight of the composition or less; and the balance made up of a solvent such as water or aliphatic alcohols. Certain embodiments of the dispersion include 28-35% by weight coal tar pitch, 8-11% dispersant, and the balance solvent. In at least one embodiment, the dispersion includes 35% by weight coal tar pitch, 10% dispersant and the balance aqueous solvent. In at least one other embodiment, the dispersion includes 28% by weight coal tar pitch, 8.25% dispersant and the balance aqueous solvent. In at least one embodiment, the dispersion includes 50% by weight coal tar pitch, 13% dispersant and the balance aqueous solvent. In at least one embodiment, the dispersion includes 50% by weight coal tar pitch, 15% dispersant and the balance aqueous solvent. In at least one embodiment, the dispersion includes 50% by weight coal tar pitch, 10% dispersant and the balance aqueous solvent.

The coal tar pitch may have a softening point in the range of 100° C.-200° C., preferably in the range of 110° C.-155° C. In at least one embodiment, the coal tar pitch has a softening point of about 132° C. In at least one embodiment, the coal tar pitch has a softening point of about 126.5° C. The coal tar pitch may include mesophase in some embodiments, such as in the range of up to about 85% mosaic mesophase in certain embodiments, up to 100% mosaic mesophase in some embodiments, in the range of 77-78% mosaic mesophase in certain embodiments, and about 3.5% mosaic mesophase in other embodiments. These are a few non-limiting examples for illustrative purposes.

The pitch particles in the dispersion have a diameter less than 10 preferably less than 5 and more preferably less than 2.5 The dispersion may be characterized has having a D50<15 μm (in which 50% of the coal tar pitch in the dispersion has a diameter of less than 15 μm) and a D90<19 μm (in which 90% of the coal tar pitch in the dispersion has a diameter of less than 19 μm). In some embodiments, the dispersion has a particle size distribution of D50<5 μm and D90<10 μm.

The solvent of the aqueous dispersion may be a solvent including but not limited to water and non-aromatic or aliphatic alcohols.

The dispersant used in the dispersion discourages the coagulation of the aromatic pitch particles in the solvent. The dispersant may include commercially available dispersants and combinations, mixtures or blends thereof. The dispersant may therefore include one active agent or multiple active agents. For instance, the dispersant may be one or more surfactants, including cationic, anionic, non-ionic, and zwitterionic surfactants. The terms "dispersant" and "surfactant" may be used interchangeably herein. The dispersant may be or include a non surface-active polymer or a surface-active substance. In certain embodiments, the dispersant may be polymeric or be comprised of co-polymers, and in some embodiments may have one or more affinity group to increase interaction with the coal tar pitch.

Another aspect of the present invention are methods of making the dispersion described above. Specifically, the methods include preparing the coal tar pitch, such as by drying or dehydrating to solid particles. In some embodiments, these solid particles may then be ground to reduce the size of the particles to less than 400 µm. In other embodiments, the coal tar particles are used without further size reduction. The method of preparing the dispersion proceeds with micronizing the coal tar pitch particles. Micronizing may occur through milling, grinding, shearing or other suitable methods. In at least one embodiment, the coal tar pitch particles are micronized by milling, such as in a ball mill, to a size of less than than 10 µm, preferably less than 5 µm, and more preferably less than 2.5 µm in diameter. The population of coal tar pitch particles once milled or micronized may preferably be D50<15 µm and D90<19 µm. The milling or micronization may be accomplished on the dry particles, after which solvent and a dispersant are added to the milled particles and mixed to form the dispersion. In other embodiments, the solvent and dispersant are added to the coal tar pitch particles prior to milling or micronization, and wet milling or micronization proceeds on the dispersion overall until the coal tar pitch particles reach the desired size as indicated above. Wet milling may be preferred to keep the temperature sufficiently low to avoid coagulation of the coal tar pitch particles during milling.

The dispersion is sufficiently viscous to limit the amount of settling of the coal tar pitch, or be readily resuspended following nominal settling, while still be flowable and/or pourable.

Another aspect of the present invention is application of the dispersion described above to graphitic materials. Dry natural or synthetic graphitic material, such as graphite particles of a spherical or spheroidal shape and a diameter in the range of 5-12 µm, 5-7 µm, 7-12 µm, 10-20 µm or preferably about 10-12 µm in diameter, are mixed with the aqueous dispersion in a ratio in the range of 5%-30% pitch to graphite on a dry basis. Some embodiments have a 7%-28% pitch to graphite ratio on a dry basis. In certain embodiments, the mixture is a 7%, 8%, 11%, 12%, 14%, 15%, 18% or 28% pitch to graphite ratio. The particular diameter of the graphite particles to be coated may be differ and be dictated by the specific end use for the coated particles, such as but not limited to electronics, appliances and automotive to name a few, and may depend on battery size, design and configuration. The mixture is agitated, such as by manual or mechanical mixing, shearing, vortexing or sonicating until the particles of the coal tar pitch from the aqueous dispersion are intermingled with the graphitic material. The mixture is then dried to remove the solvent, such as by heating at temperatures in the range of 75° C.-120° C., preferably about 80° C. in at least one embodiment, which brings the coal tar pitch particles into contact with the graphitic material. The dried mixture is then carbonized at high temperatures, such as in the range of 1000° C.-1650° C., preferably about 1100° C. in at least one embodiment and about 1450° C. in certain embodiments, to adhere the coal tar pitch particles to the surface of the graphitic material, thereby coating the graphitic material.

Another aspect of the present invention is the coated particles obtained by the application of the dispersion described above. These coated particles have a graphitic core that is at least partially coated by coal tar pitch molecules. The coated particles have a larger size than the uncoated particles, with the coating having a thickness of no more than about 2.5 µm in at least one embodiment. The coated particles may be characterized by a reduction in Brunauer-Emmett-Teller ("BET") surface area of the graphitic material, preferably having a BET surface area of less than 5 $m^2/g$ in some embodiments, and more preferably less than 3 $m^2/g$ in certain embodiments.

The coated particles may also exhibit a tap density increase that of uncoated graphitic material, such as an increase of 10-15% in some embodiments or an increase of 20-25% in certain embodiments.

These coated particles may then be used to form negative electrodes for batteries, such as Li-ion batteries, for reduced contamination and degradation of the electrode, enhanced longevity of the electrode and battery, and increased efficiency of the battery as a result of the coated particles. Tests of sample batteries made with such coated particles reveal the coated particles, and thus the aqueous dispersion used to coat the particles, are capable of creating a battery that has a charge capacity of at least 360 mAh/g, and more specifically in the range of 360-372 mAh/g; and an irreversible capacity loss of 7% or less.

The dispersion, methods of making the same, applications of the aqueous dispersion and the resulting coated particles, together with their particular features and advantages, will become more apparent from the following detailed description, Examples and with reference to the appended drawings.

DESCRIPTION OF THE DRAWINGS

Like reference numerals refer to like parts throughout the several views of the drawings.

DETAILED DESCRIPTION

As shown in the accompanying drawings, the present invention is directed to a dispersion of coal tar pitch, also referred to herein interchangeably as a slurry, pitch dispersion or dispersion, that is capable of coating graphitic materials for Li-ion battery production. The invention is also directed to methods of making such a pitch dispersion, applications of such dispersion to coat graphitic particles and the resulting coated particles themselves. The various aspects of the present invention are shown in the Figures and described below.

Pitch Dispersion

Figure 1:
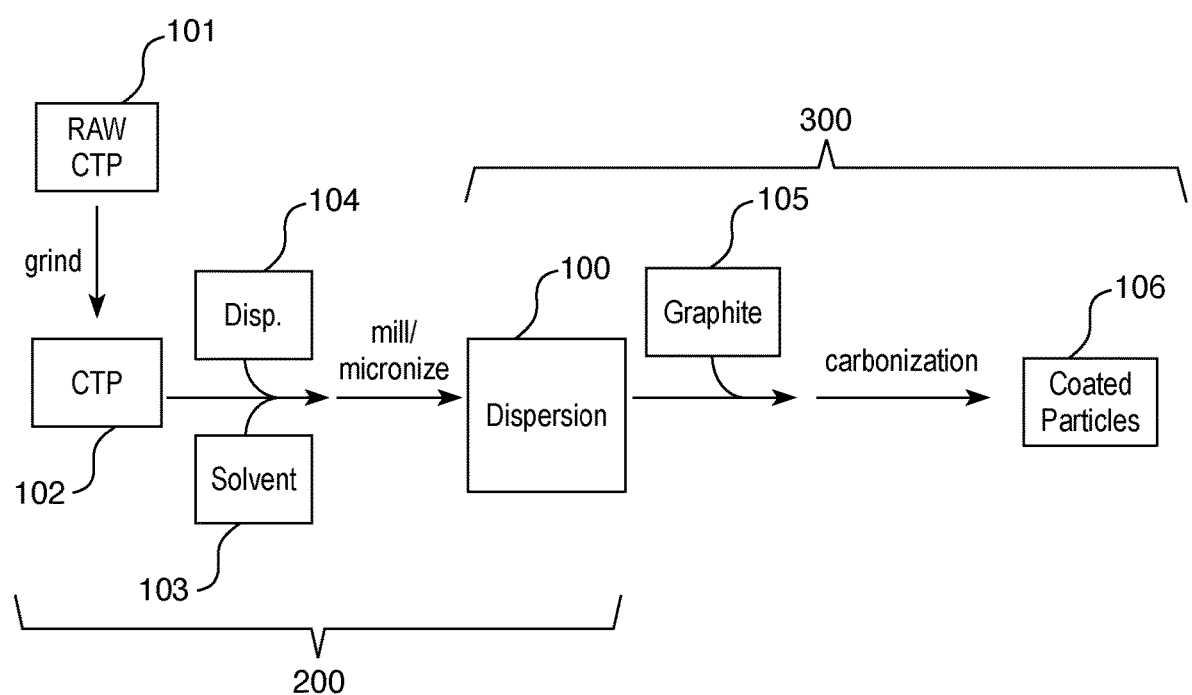
FIG. 1 is a schematic diagram of the various aspects of the manufacturing process of coated particles of the present invention.

The present invention is directed to a dispersion or slurry of coal tar pitch 100, shown in FIG. 1. This pitch dispersion 100 includes coal tar pitch 102 in dry, solid form. Such coal tar pitch 102 is made or derived from coal tar and may have a softening point in the range of 100° C.-200° C., preferably in the range of 110° C.-155° C. In certain embodiments, the coal tar pitch 102 has a softening point of about 126° C., 130° C., 132° C., 135° C. or 192° C. These are but a few non-limiting examples.

In some embodiments, the coal tar pitch 102 preferably contains no quinoline insoluble ("QI"), which may also be referred to as "zero QI" or "QI free" pitch. However, in other embodiments, the coal tar pitch 102 may contain a small amount of QI, such as no more than 0.1 though higher amounts of QI may be acceptable in other embodiments. In certain embodiments, the coal tar pitch 102 may include a certain amount of ash, such as less than 0.05%, though higher amounts of ash may be acceptable in other embodiments. The amounts of ash and QI that may be present are not related to one another and there may be no ash and some QI and vice versa, or amounts of each within acceptable limits.

In some embodiments, the coal tar pitch 102 may include a combination of coal tar pitch and mesophase, which may be defined in terms of percentage of mosaic mesophase, such as up to about 85% mosaic mesophase in certain embodiments, up to 100% mosaic mesophase in some embodiments, in the range of 77-78% mosaic mesophase in certain embodiments, and about 3.5% mosaic mesophase in other embodiments. In other embodiments, the coal tar pitch 102 may be entirely mesophase particles formed during the pitch production process. Mesophase pitch may include embryonic mesophase having sizes in the range of up to about 4 microns, preferably about 2 microns, and mesophase spheres having sizes in the range of 4-200 microns, and combinations thereof.

The particles of coal tar pitch 102 in the dispersion 100 may preferably have a diameter substantially less than 10 such as no more than 5 μm in some embodiments and no more than 2.5 μm in other embodiments. In at least one embodiment, the coal tar pitch 102 may have a D50<15 μm. In certain embodiments, the coal tar pitch 102 may have a D50<5 μm. The coal tar pitch 102 may further have a D90<19 μm in some embodiments, and a D90<9 μm in certain embodiments. The dispersion 100 includes a solvent 103 in which the coal tar pitch 102 particles are dispensed and/or suspended. The solvent 103 may be any polar, inorganic or aliphatic organic solvent, such as but not limited to water and non-aromatic alcohols, including but not limited to methanol, ethanols, isopropyl alcohols, ethylene glycol, glycerol and allylic alcohols. In at least one embodiment, the solvent 103 is water, specifically deionized water. The use of solvent 103 having the composition defined herein is important to provide a more environmentally friendly solvent for the dispersion 100 which will have fewer or no harmful effects on the environment. Previous attempts at carbonaceous coatings typically used aromatic organic solvents such as xylene and N-methyl-2-pyrrolidone in which the polyaromatic compounds found in carbonaceous materials like coal tar pitch 102 are readily miscible. However, these aromatic organic solvents require more energy to remove and have more negative impact on the environment. By using solvent 103, the solvent may be readily removed by heating in a liquid or flowable form and is much more environmentally sound than aromatic organic compounds.

Because the coal tar pitch 102 is highly aromatic and not readily soluble in polar or other solvents 103, it has a tendency to coagulate. Therefore, a dispersant 104 may also be included in the dispersion 100 to discourage coagulation and achieve dispersion or suspension of the coal tar pitch 102 particles within the solvent 103. As used herein, a dispersant 104 is a substance added to a suspension to improve the separation of coal tar pitch 102 particles and to prevent settling, clumping, agglomeration and/or aggregation of the coal tar pitch 102 particles in the dispersion 100. Dispersants 104 typically consist of one or more surfactants, either cationic, anionic or non-ionic, and may be or include a non surface-active polymer or a surface-active substance. The dispersant may be a polymeric dispersant with a pigment affinity group, such as a hydroxyl group, carboxylic acid group, sulfonate group, amine functional group or quaternary ammonium functional group. The polymeric dispersants may be copolymers. Examples of co-polymer dispersants include, but are not limited to, copolymers with pigment affinity groups, polycarboxylate ethers, modified polyacrylates, acrylic polymer emulsions, modified acrylic polymers, poly carboxylic acid polymers and their salts, modified poly carboxylic acid polymers and their salts, fatty acid modified polyesters, aliphatic polyethers or modified aliphatic polyethers, polyetherphosphates, solutions of polycarboxylate ethers, sodium polyacrylates, sodium polymethacrylates, modified polyether or polyester with pigment affinity groups, fatty acid derivatives, urethane copolymers or modified urethane copolymers, acrylic acid/maleic acid copolymers, polyvinyl pyrrolidones or modified polyvinyl pyrrolidones, modified maleic anhydride/styrene copolymers, lignins and the like.

Examples of commercially available dispersants 104 include, but are not limited to, the Disperbyk dispersant series (BYK-Chemie GmbH of Wesel, Germany), such as DISPERBYK 103, 108, 111, 118, 142, 168, 180, 410, 411, 2008, 2022, 2055, 2152, 2155 and 2164; the TEGO° Dispersant series (Evonik Industries AG of Essen, North Rhine-Westphalia, Germany), such as TEGO® Dispers 1010, 650, 652, 656, 670, 671, 672, 685, 688, 690, 710, 750, 750W, 760 and 760W; the TEGO® Wet series (Evonik Industries AG of Essen, North Rhine-Westphalia, Germany), such as the TEGO® WET 500; the EFKA dispersant series (BASF of Ludwigshafen, Germany), such as EFKA® 4008, 4009, 4010, 4015, 4020, 4046, 4047, 4050, 4055, 4061,4063, 4080, 4300, 4310, 4320, 4330, 4340, 4400, 4401, 4402, 4403, 4510, 4530, 4550, 4570.4590, 5010, 5044, 5054, 5055, 5063, 5065, 5066, 5070, 5071, 5207, 5210, 5215, 5220, 5244, 5744, 6050, 6230, 6220, 6225, 1016, 1101, 1500, 1501, 1502, 1503, 6622, 6700, 6950, 6043, 6745, 6780, 6782, FA 4600, FA 4601, FA 4620, FA 4642, FA 4644, FA 4650, FA 4654, FA 4654EM, FA 4660, FA 4663, FA 4665, and FA 4671; the Solsperse™ series (Lubrizol of Wickliffe, Ohio), such as Solsperese™ 3000, 5000S, 8000, 9000, 11200, 13300, 13400, 13650, 13940, 16000, 17000, 17940, 18000, 19000, 21000, and 22000. Dispersants from Stepan Company (of Northfield, Ill.), such as Bio-softN1-3, Bio-soft N91-2.5, Bio-soft N -411, Makon NF-12, and G-3300, Disperbyk dispersant series (BYK-Chemie GmbH of Wesel, Germany), such as DISPERBYK 102,151, 155/50, 156,180-194, 2010,2015, P-105, anti-terra 205, anti-terra 250, lactimon-WS. SolsperseTM (Lubrizol of Wickliffe, Ohio) J400, W100, W150, W200, W430, WV400, 12000S, 13500, 20000, 27000, 40000, 41090, 43000, 44000, 45000, 46000, 47000, 64000-67000; pre-commercialized developmental products internally designated as HPA419, HPA429 and HPA429A (Lubrizol of Wickliffe, Ohio); the TEGO® Dispersant series (Evonik Industries AG of Essen, North Rhine-Westphalia, Germany), such as TEGO® Dispers 650, 652, 653, 656, 660C, 740W, 745W, 747W, 750W, 752W, 755W, 757W, 760W, and 761W; the EFKAx dispersant series (BASF of Ludwigshafen, Germany), such as 1016, 1500, 1501, 1502, 1503, 4510, 4530, 4550, 4560, 4570, 4580, 4585, 4590, 5071, 5220, 5244, 6220, 6225, 6230, 6622, and 6W13, and DISPEX® dispersant series (BASF of Ludwigshafen, Germany), such as A40, N40V, GA40, G40, and HDN; the ZETASPERSE® series 170, 179, 182, 1200, 2300, 2500, 3100, 3400, 3600, 3700, and 3800 (Evonik Industries AG of Essen, North Rhine-Westphalia, Germany); the CARBOWET® series 76, 103, 106, 109, 125, 138, 144, LSF, 422, GA-100, GA-210, GA-211, and GA-221 (Evonik Industries AG of Essen, North Rhine-Westphalia, Germany); the SURFYNOL® series 104, 104H, 355, 420, 440, 465, 485W, 500S, AS 5040, CT-121, CT-131, CT-136, CT-141, CT-151, CT-171, CT-211, CT-324, DF-695, DF-70, DF-75, PSA-336, SE and TG (Evonik Industries AG of Essen, North Rhine-Westphalia, Germany); and Phospholan PS 131 (AkzoNobel of Amsterdam, Netherlands); and combinations thereof.

The dispersant 104 may include various dispersants or combinations thereof, as described in Table 1 below.

TABLE 1

| Class | Description | Example(s) |
|---|---|---|
| A | APE-free aqueous general use dispersant (40-100% active) | Solsperse ™ W100<br>Solsperse ™ W430<br>Solsperse ™ WV400 |
| B | Aqueous general use dispersant (40-100% active) | Solsperse ™ W150 |
| C | High performance carbon black dispersant | Solsperse ™ W200 |
| D | Organic general use dispersant (40-100% active) | TEGO ® WET 500<br>Solsperse ™ 20000 |

TABLE 1-continued

| Class | Description | Example(s) |
|---|---|---|
| E | Waterborne anionic dispersant agent | TEGO ® DISPERS 750W<br>ZETASPERSE ®3100 |
| F | Waterborne non-ionic dispersant containing alcohol ethoxylate | TEGO ® DISPERS 760W<br>ZETASPERSE ® 179 |
| G | Defoamer containing tetramethyldecynediol | SURFYNOL ®104H |
| H | Polymeric dispersant | Proprietary formulations. |

For instance, in at least one embodiment, such as in formulations using <30% coal tar pitch 102 in the dispersion 100, the dispersant 104 may include a 4/4/0.25% ratio of 4% wt Class E, 4% wt Class F and 0.25% wt Class D for a total of 8.25% dispersant 104 in the overall dispersion 100. In other embodiments, such as having >30% coal tar pitch 102, the dispersant 104 may include a 4.5/4.5/1% ratio of 4.5% wt Class E, 4.5% wt Class F and 1% wt Class D for a total of 10% dispersant 104 in the overall dispersion 100. In some embodiments, the dispersant 104 may include 7.5% wt Class E, 7.5% wt Class F and 3% wt Class D for a total of 15% dispersant 104 in the overall dispersion 100. In other embodiments, the dispersant 104 may include 4.5% wt Class D, 7.5% wt Class F and 1% wt Class G for a total of 13% dispersant 104 in the overall dispersion 100. In still other embodiments, the dispersant 104 may include 10% wt Class D, 16.7% wt Class F and 2.2% wt Class G for a total of 30% dispersant 104 in the overall dispersion 100. In still other embodiments, the dispersant 104 may include 10% wt Class D, 16.7% wt Class F and 2.2% wt Class G for a total of 25% dispersant 104 in the overall dispersion 100. In still other embodiments, the dispersant 104 may include 10% wt Class D, 16.7% wt Class F and 2.2% wt Class G for a total of 20% dispersant 104 in the overall dispersion 100. In still other embodiments, the dispersant 104 may be a single commercial product, such as but not limited to 20% wt. Class A; 10% wt. Class B; 20% Class C; 20% wt. Class D; 20% wt. Class H; 10% wt. Class A; 15% wt. Class A; and 15% wt. Class H. These are a few non-limiting examples. The amounts and ratios of dispersant 104 used are based on commercially available products as sold. The particular dilutions and concentrations of active ingredients are unknown. All calculations, specific amounts and concentrations of dispersant 104 used in the dispersion 100 as disclosed herein, including mixtures thereof, are based on commercial product liquid volume, not the active ingredient(s). It should be specifically understood that, to the extent the dispersant 104 and/or any constituents thereof are diluted, the calculations would need to include the relevant dilution factor, if known.

In some embodiments, the dispersant 104 used in the dispersion 100 may include, but is not limited to cationic, non-ionic or anionic dispersants, acrylic copolymers, an aqueous solution of copolymers with pigment affinity groups, polycarboxylate ethers, modified polyacrylates, acrylic polymer emulsions, modified acrylic polymers, poly carboxylic acid polymers and their salts, modified poly carboxylic acid polymers and their salts, fatty acid modified polyesters, aliphatic polyethers or modified aliphatic polyethers, polyetherphosphates, solution of polycarboxylate ethers, sodium polyacrylates, sodium polymethacrylates, modified polyether or polyester with pigment affinity groups, fatty acid derivatives, urethane copolymers or modified urethane copolymers, acrylic acid/maleic acid copolymers, polyvinyl pyrrolidones or modified polyvinyl pyrrolidones, modified maleic anhydride/styrene copolymers and lignins. Preferably, the dispersant 104 may be capable of binding to graphite particles.

In other embodiments, the dispersant 104 may be a non-ionic surfactant having no discrete charge when dissolved or suspended in the solvent 103. The surfactant hydrogen bonds with the solvent 103 molecules, providing hydrophilicity. Such hydrogen bonding can provide a dispersion, suspensibility or solubilization of the coal tar pitch 102 in the solvent 103. Non-ionic surfactants may include polyalkylene oxide block copolymers having at least one block segment comprising -(AO)x-, wherein AO represents an oxyalkylene moiety and x is a number of about 1 to about 100. Preferably, AO represents either an ethylene oxide moiety or a propylene oxide moiety. The -(AO)x- block must be attached to a functional group differing in hydrophilicity or hydrophobicity.

Exemplary surfactants/dispersants 104 may include but are not limited to ethoxylates of castor oil, such as ethyleneoxide degree of polymerization 30 60 ethoxy moieties; ethoxylates of tridecylalcohol having an ethyleneoxide degree of polymerization of 4 to 20; ethoxylates of a C10 C14 alcohol having an ethyleneoxide degree of polymerization of 4 to 20; ethoxylates of nonylphenol having an ethyleneoxide degree of polymerization of 6 to 50; ethoxylates of a fatty alcohol having an ethyleneoxide degree of polymerization of 3 to 20; ethoxylates of a sorbitol ester having an ethyleneoxide degree of polymerization of 10 to 40; ethoxylates of a sorbitan-tallate having an ethyleneoxide degree of polymerization of 10 to 40; ethoxylates of a tristyrphenol having an ethyleneoxide degree of polymerization of 3 to 20; ethoxylates of a isodecyl alcohol having an ethyleneoxide degree of polymerization of 3 to 10; ethoxylates of a isododecyl alcohol having an ethyleneoxide degree of polymerization of 3 to 10, or mixtures thereof.

Non-ionic surfactants may be used as the dispersant 104 in some embodiments. Such non-ionic surfactants may include a polycondensation product containing an alkylene glycol as a monomer. Exemplary compounds include but are not limited to polyethylene glycol, polypropylene glycol, and block polymers of ethylene glycol and propylene glycol. The degree of polymerization of these compounds is preferably in the range of about 5 to about 1,000, and more preferably in the range of from about 10 to about 500.

Non-ionic dispersants 104 may further include polyalkylene oxide block copolymers typically having at least one block segment comprising -(AO)x-, wherein AO represents an oxyalkylene moiety and x is a number of about 1 to about 100. Preferably, AO represents either an ethylene oxide moiety or a propylene oxide moiety. The -(AO)x- block is attached to a functional group differing in hydrophilicity (or hydrophobicity). Such copolymers can be derived from higher alkylene oxides such as ethylene oxide, propylene oxide, butylene oxide, styrene oxide, and others. Such block copolymers typically contain a polyethylene oxide block which is relatively hydrophilic combined with another polyalkylene oxide block which is typically hydrophobic, resulting in surfactant properties. Another exemplary non-ionic surfactant includes polyoxypropylene-polyoxyethylene block copolymer surfactants. Those surfactants comprise a center block of polyoxypropylene units (PO) and have a block of polyoxyethylene (EO) units to each side of the center PO block. Such block copolymer surfactants may have an average molecular weight ranging from about 900 to 14,000, and the percent of weight EO ranges from about 10 to 80 and are sold commercially as "Pluronics."

In other embodiments, the dispersant 104 may be a non-ionic surfactant including an etherified compound and an aliphatic alcohol. Such a dispersant would have, for instance, a polyethylene oxide block which is relatively hydrophilic combined with a long alkyl section, e.g., C6 to C30, which is typically hydrophobic, resulting in surfactant properties. Exemplary compounds include but are not limited to polyethylene glycol oleyl ether having an ethyleneoxide degree of polymerization of 4 to 50, polyethylene glycol cetyl ether having an ethyleneoxide degree of polymerization of 4 to 50, polyethylene glycol stearyl ether having an ethyleneoxide degree of polymerization of 4 to 50, polyethylene glycol lauryl ether having an ethyleneoxide degree of polymerization of 4 to 50, polyethylene glycol tridecyl ether having an ethyleneoxide degree of polymerization of 4 to 50, polyethylene glycol nonylphenyl ether having an ethyleneoxide degree of polymerization of 4 to 50, and polyethylene glycol octylphenyl ether having an ethyleneoxide degree of polymerization of 4 to 50. In some embodiments, the degree of polymerization for compounds in this class is in the range of from 4 to 20, for example between about 6 to about 12.

A subgroup of this type of dispersant 104 may include an etherified compound of the above-mentioned group of compounds and a higher fatty acid. Exemplary compounds include but are not limited to polyethylene glycol monolaurate having an ethyleneoxide degree of polymerization 2 to 50, polyethylene glycol monostearate having an ethyleneoxide degree of polymerization 2 to 50, and polyethylene glycol monooleate having an ethyleneoxide degree of polymerization 2 to 50.

In some embodiments, the dispersant 104 may be a hydrophobically modified pluronic surfactant in which a modifying group (R) such as a methyl, ethyl, propyl, butyl, benzyl, etc. may cap the terminal oxy alkaline group, such as for example R-(EO)n-(PO)m-(EO)n-R. In still other embodiments, the dispersant 104 may be a linear alcohol alkoxylate, such as linear alcohol ethoxylate or an ethyoxylated/propoxylated block. If desired, the alcohol alkoxylate may be suitably end-capped with a lower alkyl group, and such a product is commercially available as POLY-TERGENT SLF-18 surfactant, available from BASF Corporation. Other useful anionics are polycarboxylated alcohol alkoxylates, preferably those selected from the group consisting of the acids or organic or inorganic salts of the following: polycarboxylated linear alcohol alkoxylates, polycarboxylated branched alcohol alkoxylates, polycarboxylated cyclic alcohol alkoxylates, and combinations thereof. Nonionic surfactants include, for example: alkylphenol ethoxylates, for example, ethoxylated nonyl phenol, alkylphenol ethoxylate or nonylphenol ethoxylate containing from about 1 to about 20 or more moles of ethylene oxide per mole of phenol.

In further embodiments, the dispersant 104 may include a group having phosphate or, less preferably, sulfate or sulfonate esters of any of the above-mentioned groups of compounds. Exemplary compounds include but are not limited to polyethylene glycol oleyl ether phosphate having an ethyleneoxide degree of polymerization of 4 to 50, polyethylene glycol cetyl ether phosphate having an ethyleneoxide degree of polymerization of 4 to 50, polyethylene glycol stearyl ether phosphate having an ethyleneoxide degree of polymerization of 4 to 50, polyethylene glycol lauryl ether phosphate having an ethyleneoxide degree of polymerization of 4 to 50, polyethylene glycol tridecyl ether phosphate having an ethyleneoxide degree of polymerization of 4 to 50, polyethylene glycol nonylphenyl ether phosphate having an ethyleneoxide degree of polymerization of 4 to 50, and polyethylene glycol octylphenyl ether phosphate having an ethyleneoxide degree of polymerization 4 to 50.

In certain embodiments, the dispersant 104 may be an APE-free aqueous general use dispersant having 40-100% active agent(s), such as but not limited to Solsperse™ W100 and Solsperse™ W430. In certain embodiments, the dispersant 104 may be an aqueous general use dispersant having 40-100% active agent(s), such as but not limited to Solsperse™ W150. In certain embodiments, the dispersant 104 may be a high-performance carbon black dispersant, such as but not limited to Solsperse™ W200. In certain embodiments, the dispersant 104 may be an organic general use dispersant having 40-100% active agent(s), such as but not limited to Solsperse™ 20000 and TEGO® WET 500. In certain embodiments, the dispersant 104 may be a waterborne anionic dispersant agent, such as but not limited to ZETASPERSE® 3100 and TEGO® DISPERS 750W. Such waterborne anionic dispersant agents have strong affinity for the surface of carbon pitch, which is highly aromatic, through polar-polar interactions or Van der Waals interactions. In certain embodiments, the dispersant 104 may be a waterborne non-ionic dispersant containing alcohol ethoxylate, such as but not limited to ZETASPERSE® 179 and TEGO® DISPERS 760W. In certain embodiments, the dispersant 104 may be a defoamer containing tetramethyldecynediol, such as but not limited to SURFYNOL® 104H. In certain embodiments, the dispersant 104 may be a polymeric dispersant, including proprietary blends. These are but a few non-limiting examples.

Thus, the components of the dispersion 100 are coal tar pitch 102 and dispersant 104, with a balance of solvent 103 to reach 100%. The amounts of each may be as shown in Table 2. The dispersant 104 may be any listed in Table 1 above and combinations thereof.

TABLE 2

| Coal Tar Pitch (by wt.) | Dispersant (by wt.) |
|---|---|
| ≤55% | ≤60% |
| 50% | 10-15% |
| 28-35% | 8.25-11% |

In at least one embodiment, the dispersion 100 includes up to 55% by weight coal tar pitch 102, up to 60% by weight dispersant 104 and the remaining balance deionized water as solvent 103. In some embodiments, the dispersion 100 includes less than 30% by weight coal tar pitch 102, 8.25% by weight dispersant 104 and the remaining balance deionized water as solvent 103. In another embodiment, the dispersion 100 includes 30% by weight coal tar pitch 102, 9% by weight dispersant 104 and the remaining balance deionized water as solvent 103. In another embodiment, the dispersion 100 includes 30% by weight coal tar pitch 102, 10% by weight dispersant 104 and the remaining balance deionized water as solvent 103. In another embodiment, the dispersion 100 includes 30% by weight coal tar pitch 102, 11% by weight dispersant 104 and the remaining balance deionized water as solvent 103. In other embodiments, the dispersion 100 includes 35% by weight coal tar pitch 102, 10% by weight dispersant 104 and the remaining balance deionized water as solvent 103. In another embodiment, the dispersion 100 includes 28% by weight coal tar pitch 102, 8.25% by weight dispersant 104 and the remaining balance deionized water as solvent 103. In another embodiment, the dispersion 100 includes 25% by weight coal tar pitch 102, 8% by weight dispersant 104 and the remaining balance deionized water as solvent 103. In another embodiment, the dispersion 100 includes 50% by weight coal tar pitch 102, 15% by weight dispersant 104 and the remaining balance deionized water as solvent 103. In another embodiment, the dispersion 100 includes 50% by weight coal tar pitch 102, 13% by weight dispersant 104 and the remaining balance deionized water as solvent 103. In another embodiment, the dispersion 100 includes 50% by weight coal tar pitch 102, 10% by weight dispersant 104 and the remaining balance deionized water as solvent 103.

The specific amounts of each component in the dispersion 100 may vary depending on the softening point of the coal tar pitch 102, the particular dispersant(s) 104 and its chemical properties, and the particular solvent 103 used. For instance, in at least one embodiment, coal tar pitch 102 having a softening point of 130° C., a mixture of Class E, Class F and Class D as the dispersant 104 in ratios of 4/4/0.25% wt respectively may be used for formulations having <30% coal tar pitch 102 and ratios of 4.5/4.5/1% wt respectively may be used for formulations having >30% coal tar pitch, and deionized water as the solvent 103. In at least one embodiment, coal tar pitch 102 having a softening point of 132° C., a mixture of Class E, Class F and Class D as the dispersant 104 in ratios of 7.5/7.5/3% wt respectively may be used for formulations having 50% coal tar pitch 102 and 15% dispersant 104.

The dispersion 100 should include a sufficient amount of coal tar pitch 102 to coat graphitic material, such as graphite particles having a diameter of about 10 to 12 microns. However, too much coal tar pitch 102 reduces the mobility of the dispersion 100, making it less flowable and too difficult to manipulate. Too little dispersant 104 results in coagulation, or partial coagulation, of the coal tar pitch 102 in the dispersion 100. Too much dispersant 104, however, can cause the dispersion 100 to be soapy or foamy, causing the dispersion 100 to coat the graphitic particles ineffectively. Therefore, a balance of these components is important.

Method of Making Dispersion

The present invention is also directed to methods of making a dispersion as described above, as at 200, referring to FIGS. 1 and 2. The first step in the method 200 of making the dispersion, is preparing the coal tar pitch particles, as at 210. This may include drying raw coal tar pitch 101 to ensure it is dehydrated and lacking moisture. The raw coal tar pitch 101 may be characterized as explained above for the coal tar pitch 102. It also may include creating coal tar pitch particles 102 of a size as described above. To accomplish this, the raw coal tar pitch 101 may be subjected to grinding, milling, micronizing, or other techniques to break up the raw coal tar pitch 101 into particles and reduce the size of the particles to the desired size. For instance, in at least one embodiment, the raw coal tar pitch 101 may be ground or sheared in a grinder, such as with blades. In at least one other embodiment, the raw coal tar pitch 101 may be milled by compressive or frictional forces, such as but not limited to by ball mill, pebble mill, grinding mill, tower mill, roller mill, hammer mill and others. The raw pitch particles 101 are ground and passed through a sieve to isolate the particles having a sufficient size to use in the remainder of the method 200. In at least one embodiment, the raw coal tar pitch 101 is ground until the size of the resulting pitch is reduced to a range of about 74 microns to <500 microns, as it was found in initial experiments that particles larger than 500 microns may clog the instruments used in certain embodiments of the method 200. However, in other embodiments the raw coal tar pitch 101 may be ground to different sizes depending on the scale of production and instrumentation or equipment used for the remainder of the method 200. In still other embodiments, reducing the size of the raw coal tar pitch 101 by an initial grinding is not necessary, instead using larger particles. However, excessively large particles, such as greater than 850 μm in size, may be removed such as by an appropriately sized sieve or screen before continuing with the method 200.

Figure 2:
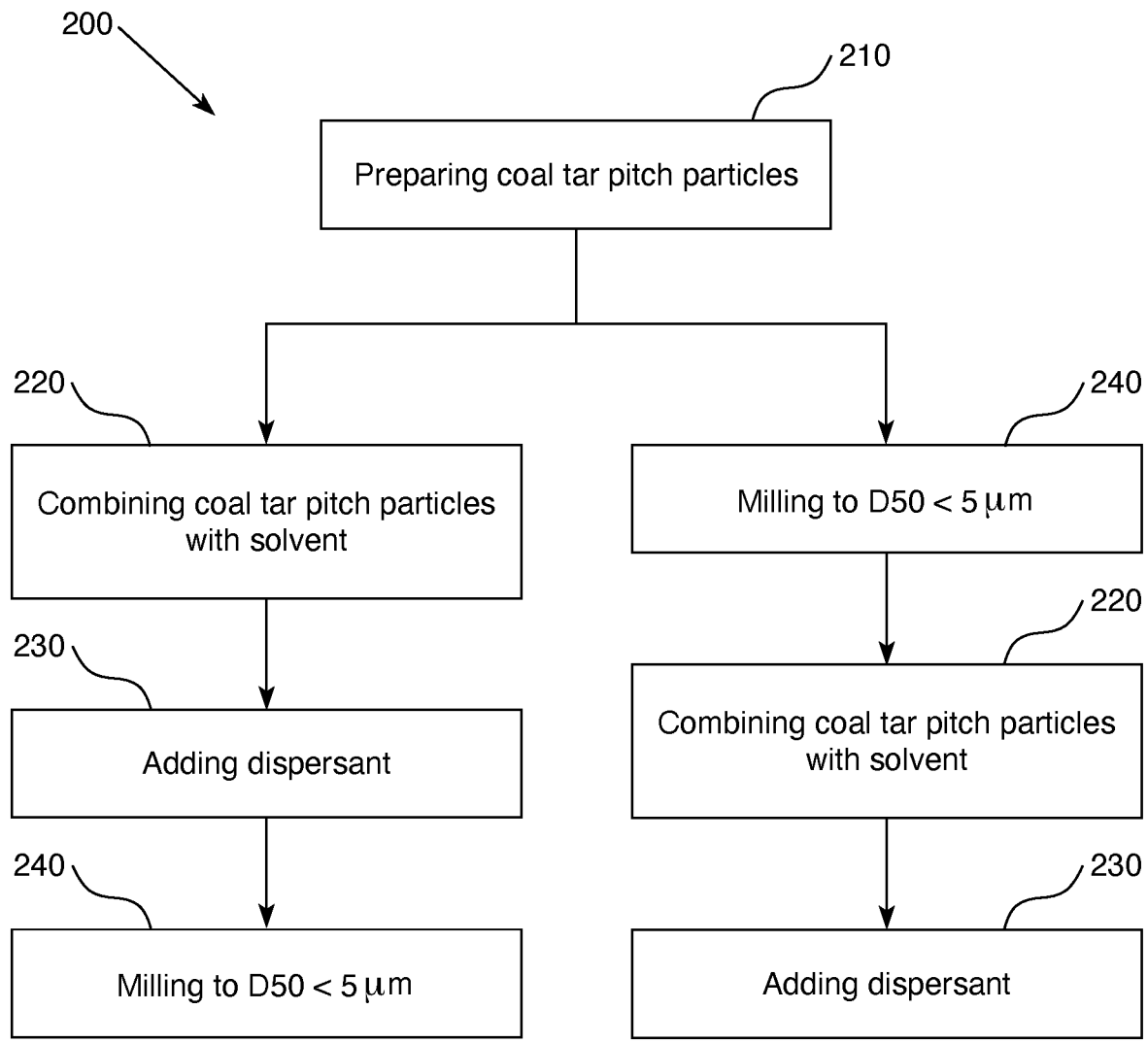
FIG. 2 is a schematic diagram of various methods of making the coal tar pitch dispersion of the present invention.

The method 200 continues with either wet milling, shown on the left in FIG. 2, or dry milling, shown on the right in FIG. 2. For instance, in wet milling, the method 200 includes combining the prepared coal tar pitch particles 102 with solvent 103, as at 220, and adding dispersant, as at 230. The coal tar pitch particles 102 at this point may have a diameter of <400 microns, according to the sieving of the ground raw particles. An initial amount of solvent 103 may be added to wet the coal tar pitch particles 102 and to better receive the dispersant 104, and then additional solvent 103 may be added to bring the mixture to volume. The order of adding the dispersant 104 and solvent 103 may not be important. Specific amounts of dispersant 104 and solvent 103 added are as outlined above and in Table 1 and in the Examples below and may vary depending on the amount of coal tar pitch particles 102, the particular dispersant 104 used, the total volume of the desired batch, and the capacity of the mill used in the next step.

The method 200 continues with milling the mixture, as at 240, to reduce the size of the coal tar pitch particles 102 to a sufficient size for coating graphitic material. For instance, in at least one embodiment milling may occur until the coal tar pitch particles 102 are less than 5 μm in diameter, or until the mixture achieves D50<15 μm, where 50% of the mixture contains coal tar particles 102 having a diameter of less than 15 μm and/or D90<19 μm where 90% of the mixture contains coal tar particles 102 having a diameter of less than 19 μm. In certain embodiments, the mixture is milled until the coal tar particles 102 having a particle size distribution of D50<5 μm and/or D90<10 μm is achieved.

The milling of the mixture, as at 240, may occur by compressive or frictional forces, such as but not limited to by ball mill, pebble mill, grinding mill, tower mill, roller mill, hammer mill and others. In at least one embodiment, a ball mill may be used to mill the mixture. In such embodiments, the balls used for milling may be made of suitable material, such as but not limited to stainless steel, metals, metal alloys, stone, and others. In some embodiments, the balls may be made of stainless steel. Various sizes of the balls used for milling are also contemplated and may vary depending on the size and holding capacity of the mill. For instance, the balls may measure in the range of 3-7 mm diameter, though in at least one embodiment 3 mm diameter balls and/or 5 mm balls are used. Without wishing to be bound by theory, it is thought that smaller diameter balls may provide faster milling times. Milling may occur at variable speed or constant speed, depending on the operative parameters of the mill used. For instance, ball milling may occur at a constant speed as dictated by the capabilities of the ball mill.

The time required to mill the raw coal tar pitch 101 to the desired coal tar pitch particles 102 may depend on a number of factors, including the initial size of the particles, type of pitch, softening point of the pitch, amount of pitch, amount of dispersant, size of milling balls or other milling components, and number of milling balls or milling components, among others. For instance, coal tar pitch containing meso- phase may take longer to mill to a desired size than coal tar pitch alone, as demonstrated in Example 1 and FIG. 4. Coal tar pitch with lower softening points may take longer to mill to the desired size than pitches having a higher softening point, as demonstrated in Example 2 and FIG. 5. The higher percentage of coal tar pitch in the wet dispersion while milling, the faster the pitch will mill to the desired size, as shown in Example 3 and FIG. 6, although there are limits for ease of handling. For instance, it was found that in some embodiments pitch percentages above 35% may be too thick to easily pour or handle, even once milled, so some embodiments of the dispersion 100 may have no more than 35% coal tar pitch by weight, at least when being milled. Increased dispersant also reduces the time to mill to the desired size, as demonstrated in Example 4 and FIG. 7, though this too is also limited. For instance, too much dispersant may interfere with or inhibit further analysis of the resulting milled particles. In the case of mixtures of Class E, Class F and Class D as a dispersant, this was found to be at 11% dispersant and greater, so at least one embodiment of the dispersion 100 may include no more than 10% dispersant by weight. However, in other embodiments using different dispersants and combinations thereof, up to a 5 to 1 ratio of the dispersant to the coal tar pitch by weight may be used. In addition, when implementing ball milling, smaller diameter milling balls generally enable smaller milled particle sizes. Also, increasing the number of milling balls during milling reduces the time to mill the pitch to the desired size, to a point within reasonable limits, such as demonstrated in Example 5 and FIG. 8. The actual number and size used may vary depending on the size and maximum capacity of the milling or grinding system. In some embodiments, milling time to achieve the desired particle size distribution of the coal tar particles 102 may be at least 30 minutes. In other embodiments, the milling time to achieve the desired particle size distribution may be up to 400 minutes. In other embodiments, the milling time to achieve the desired particle size distribution may be up to 135 minutes. In other embodiments, the milling time to achieve the desired particle size distribution may be 30 to 75 minutes. In certain embodiments, the milling time to achieve the desired particle size distribution may be 30 to 45 minutes. In certain embodiments, the milling time to achieve the desired particle size distribution may be 60 to 75 minutes. In certain embodiments, the milling time to achieve the desired particle size distribution may be 30 minutes. These are a few non-limited examples.

The above describes a wet milling procedure, which may be preferred in at least one embodiment to keep the coal tar pitch 102 particles from coagulating together during the milling process. However, in certain embodiments, the coal tar pitch particles 102 may be dry milled from a size <400 μm to <5 μm, using a ball mill as described above or another milling technique, prior to combining with aqueous solvent 103 or dispersant 104 to form the dispersion/slurry 100.

However, dry milling may cause the coal tar pitch particles 102 to coagulate and/or agglomerate together, inhibiting or reducing the dispersion of the coal tar pitch particles 102 within the resulting slurry 100. Many of the same considerations notes above, including type of pitch, softening point of the pitch, amount of pitch, size of milling balls or other milling components, and number of milling balls or milling components, among others, may also affect the milling speed or efficiency when dry milling. Heat generation from milling can be managed by cooling jackets surrounding the milling equipment in certain embodiments.

Regardless of whether wet or dry milling or some other size reduction technique is employed, the result of the method 200 is a dispersion 100 as characterized and defined above in the section on dispersion composition. Preferably, the coal tar particles within the dispersion 100 have a D50<5 μm and preferably remains suspended in the solvent 103 or exhibits limited settling and is easily and/or quickly resuspended following any settling.

The degree or level of suspension homogeneity in solvent 103 may be assessed by measuring the viscosity of the dispersion 100, such as with a rheometer or other suitable device. Settling may be assessed by visual inspection over a period of days, such as but not limited to 10 days, 15 days, 20 days, 28 days, 30 days or more. For instance, the amount of sediment that collects at the bottom of a container may be measured as compared to the remaining unsettled solution, such as by visual comparison to graduations on the side of a transparent container as was performed in Example 12. Other suitable methods that do not disturb the container during the study may also be used. It is preferable that more of the coal tar pitch 102 particles remain in the unsettled fraction rather than the settled fraction of these studies. Resuspension following settling may occur by any suitable method of agitation, including but not limited to vortex mixing, shaking, stirring or high-speed mixing at appropriate speeds such as but not limited to in the range of 1000 to 1600 rpm for mixing and in the range of 600 to 700 cycles per minute for shaking. Resuspension times are as minimal as possible, such as but not limited to 8 minutes or less, 3 minutes or less, 2 minutes or less, 1 minute or less, or most preferably no need resuspension at all. Example 12 provides further detail of characterizations of the dispersion 100.

Application of Dispersion

Figure 3:
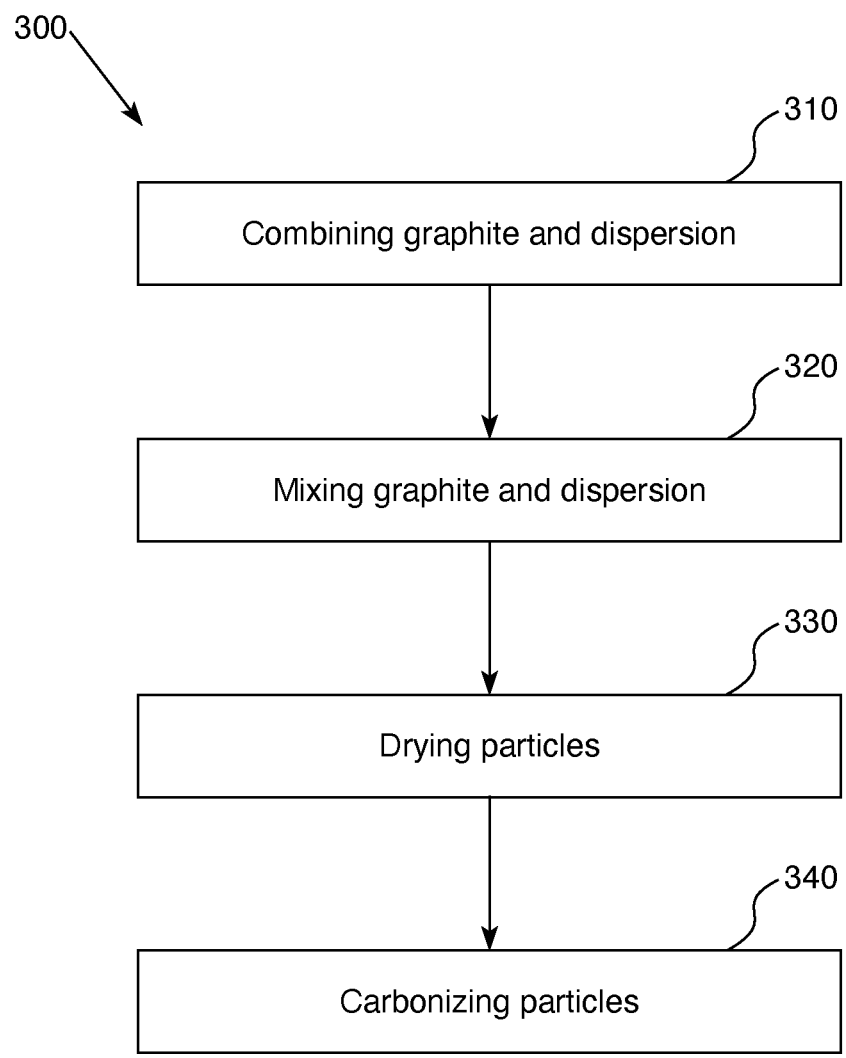
FIG. 3 is a schematic diagram of the application of the aqueous coal tar pitch dispersion to graphitic material of the present invention.

The present invention is also directed to methods of applying the dispersion to graphitic material, as at 300 shown in FIG. 3 and illustrated in FIG. 1. For instance, the method of applying, as at 300, includes combining graphitic material, such as graphite particles, with a coal tar pitch dispersion, as at 310. The coal tar pitch dispersion 100 is as described and characterized above, and preferably having a composition as outlined in Table 2 and having coal tar pitch particles of about D50<15 μm and/or D90<10 μm in size.

The graphitic material 105 may preferably be graphite particles, which may be natural or synthetic graphite made from a suitable carbon source. The graphitic material 105 may have any suitable shape, such as but not limited to spherical, spheroidal, ellipsoid and oblong. The graphitic material 105 is also sized and has other characteristics suitable for use in electrode manufacture, depending on the ultimate end use and industry of application, such as but not limited to use in batteries including Li-ion batteries. For instance, in at least one embodiment, the graphitic material or graphite particles 105, which terms may be used interchangeably herein, may have particle sizes in the range of 5-12 microns. In other embodiments, the graphite particles 105 may be in the range of about 5-7 microns, while in other embodiments they may be in the range of about 7-12 microns. In at least one embodiment, the graphite particles 105 have a size of about 10 microns. In some embodiments, the graphite particles 105 have a size in the range of about 10-12 microns.

In still other embodiments, the graphite particles 105 may be in the range of 10-20 microns in diameter. These sizes are diameters of the graphite particles 105 and may represent the entire population of graphite particles 105 or a portion thereof, such as a D50 level of particles sizes wherein 50% or more of the graphite particles 105 have the desired size. This may be based on weight or volume of the total graphite particles 105.

The amount of coal tar pitch dispersion 100 and graphite particles 105 to combine in step 310 may affect the coating of the graphite particles 105. For instance, the ratio of coal tar pitch dispersion 100 and graphite particles 105, also referred to herein as the pitch to graphite ratio, may be in the range of 5%-30% pitch to graphite ratio on a dry basis in at least one embodiment. In certain embodiments, the ratio may be in the range of 7%-28% pitch to graphite ratio on a dry basis. In certain embodiments, the ratio may be in the range of 10%-20% pitch to graphite ratio on a dry basis. This means that a sufficient amount of the dispersion 100 is added to graphite 105 such that the resulting amount of coal tar pitch particles in the mixture is the stated percentage of the amount of graphite present in the mixture. For instance, in a mixture having a 15% pitch to graphite ratio, the amount of pitch present is 15% the amount of graphite present. Exemplary ratios include but are not limited to 7%, 8%, 11%, 12%, 14%, 15%, 16%, 18% and 28% pitch to graphite ratio. The percentages may also be referred to herein as weight percentages or wt. %.

The amount of pitch and graphite needed for the resulting mixture can be calculated as follows:

$$Y = X(\% \text{ ratio})$$
$$D = \frac{Y}{\% \text{ dispersion}}$$

where X is the amount of graphite particles in grams, % ratio is the desired pitch to graphite ratio, Y is the amount of pitch in grams, D is the amount of coal tar pitch dispersion needed, and % dispersion is the percentage of the coal tar pitch in the starting dispersion, all in grams. Accordingly, the amount of pitch and graphite needed can be determined based on the percentage or ratio desired, and the amount of coal tar pitch dispersion needed to provide the desired amount of pitch can be determined from the percentage of the coal tar pitch in the dispersion. Though described here in grams, other units of weight measurement may also be used. Similarly, in certain embodiments, volumetric units of measure may be used instead of or in combination with weight measurements. Calculating by weight may be preferential in at least one embodiment since the aqueous solvent will be driven off during a later step of the process so the amount of liquid involved may not matter to the calculations, except as far as it may be necessary for determining the volume that will be accommodated in the vessels for the mixing and other steps of the method of applying 300.

The coal tar pitch dispersion 100 and graphite particles 105 may be combined, as at 310, in a suitably sized vessel that will accommodate both ingredients. In some embodiments, the coal tar pitch dispersion 100 may be stirred, shaken, vortexed, mixed or otherwise agitated, either manually or by mechanical methods, prior to combining with the graphite particles 105 to ensure the coal tar pitch particles are suspended and dispersed within the dispersion 100 and that the dispersion 100 can be handled and transferred from one vessel to another. For instance, agitation may be beneficial or required to offset any settling of the coal tar pitch particles that may have occurred in the dispersion 100 during storage. Similarly, the dispersion 100 should be able to be poured or otherwise transferred from the storage vessel to the vessel for combining with graphite particles. The coal tar pitch particles in the dispersion 100 should flow with the dispersion into the new vessel for combination.

Once combined, the method of applying 300 continues with mixing the graphite and coal tar pitch dispersion, as at 320. In some embodiments, mixing may occur manually, such as but not limited to with a stir rod, shaking or inverting the mixing vessel. In other embodiments, mixing may occur mechanically by an instrument, such as but not limited to a shear mixer, high speed shear mixer, vortex, magnetic stir rod, tilt or inversion table. These are but a few non-limiting examples. The mixing step 320 facilitates the movement of the coal tar pitch particles around the graphite particles for contact with and subsequent adhesion thereto. Mixing may occur at speeds and for a time sufficient to incorporate the coal tar pitch particles and the graphite particles. This may be determined visually, by a homogeneous appearance in the mixture, or by other methods. The speed and time of mixing may also depend on the volume or amount of the dispersion 100 and graphite 105 being mixed, the capacity of the mixing vessel, the mixing technique being implemented and other factors. For instance, the dispersion 100 and graphite 105 may be mixed for less than 1 minute, in the range of 1-5 minutes, up to 10 minutes, up to 30 minutes, and up to an hour. These are but a few non-limiting examples. In at least one embodiment, the dispersion 100 and graphite 105 may be mixed for less than one minute, such as about 10-30 seconds. In other embodiments, the dispersion 100 and graphite 105 may be mixed for about 5 minutes. Notably, because the coal tar pitch particles were provided as part of an aqueous dispersion, the mixing step with the graphite particles also occurs in an aqueous solvent, such as the same aqueous solvent as was present in the dispersion 100.

Once the coal tar pitch particles and graphite particles have been sufficiently mixed to permit interspersion and contact between the particles, with the coal tar pitch particles at least partially coating the graphitic material, the method of applying 300 continues with drying the particles, as at 330. In this step, the aqueous solvent present in the mixture of coal tar pitch particles and graphite 105 is driven from the mixture, such as by heat, to remove the aqueous solvent. Because the solvent 103 is non-aromatic, there is no need to capture the evolved solvent for future use as it is removed from the mixture, as is typically the case when using aromatic solvents. In this way, the present method of applying 300 is more efficient and economical than other known ways of coating graphite particles, in addition to being more environmentally friendly.

Heat is used to dry the particles, as at 330. Without being bound by theory, because the solvent used is a non-aromatic solvent, the amount of heat needed to evaporate off the solvent is less than the amount needed to distill off aromatic solvents used in other known methods. The boiling point of water and non-aromatic alcohols is lower than the boiling point for aromatic solvents, so removal of the solvent can occur more quickly and with lower added heat in the present method of applying 300. This also has the benefit of limiting the amount of coagulation of the coal tar pitch on itself rather than adhering to the graphite particles. The heat needed and temperature required to produce the same is dependent on the boiling point of the particular solvent. In at least one embodiment, drying of the particles may occur at temperatures in the range of 75-120° C. In certain embodiments, drying of the particles occurs at about 80° C. In other embodiments, drying of the particles occurs at about 100° C. These are a few non-limiting examples. The amount of time needed for the drying step may vary depending on the volume and configuration of the mixture while drying. For instance, larger volumes of mixtures, such as at industrial scale, may take longer to dry than the same mixture at smaller volumes, such as bench or laboratory scale. Similarly, bulky or rounded configurations with limited surface area may take longer to dry than long flat configurations with greater surface area of the same mixture. For instance, in some embodiments as described in the bench scale experiments described in Examples 6 and 7, the drying step took about 30-60 minutes to dry the samples which were in flat boats. These are illustrative embodiments and are not meant to be limited.

The drying step, as at 330, may also include ramping the temperature of the furnace used for drying from ambient temperature to the desired drying temperature. This temperature ramp may be as dictated by the furnace or other equipment used for drying and may occur at a programmable rate. In at least one embodiment, the furnace may ramp at a rate of up to 5° C./min. In other embodiments, as in Examples 6 and 7, the ramp rate may be about 2° C./min. Other ramp rates are also contemplated.

The method of applying 300 continues with carbonizing the particles, as at 340. The carbonizing step applies high heat to adhere the coal tar particles to the surface of the graphitic material. Carbonization may occur by various profiles of heating, including ramping temperature rates, hold or soak times, and cooling times. For instance, in at least one embodiment, carbonization occurs in the range of 1000° C.-1650° C. In certain embodiments, carbonization occurs at about 1100° C. In certain embodiments, carbonization occurs at about 1450° C. These are just a few non-limiting examples. Similar to drying, the time necessary to carbonize may depend upon the volume and configuration of the sample such as it affects the surface area available for heating, with higher surface area exposed requiring less time for carbonization than samples having lower surface area exposed during carbonization. In at least one embodiment, carbonization may occur at 1000° C. for 30 minutes, such as for a bench scale sample as described in Examples 6 and 7.

In addition, the carbonization step may also include ramping up to temperature and/or cooling down from the carbonization temperature. For instance, in at least one embodiment, carbonization may include ramping up from the drying temperature to the carbonization temperature at a rate in the range of 0.5-10° C./min. In some embodiments, the ramp rate may be constant while in others it may be variable. For instance, in some embodiments, the ramp may include intermediate steps with different rates of temperature increase. For example, as demonstrated in Examples 6 and 7, a first ramp rate may be about 1.0° C./min from the drying temperature of 80° C. to about 300° C., then a second ramp rate of about 0.5° C./min from 300° C. to 575° C., and then a third ramp rate of about 7.5° C./min from 575° C. to 1000° C. This is but one non-limiting example. In other embodiments, the carbonization ramp rate profile may start from ambient temperature rather than the drying temperature. In still other embodiments, the carbonization profile may include the drying step, as at 330, the carbonization step, as at 340, and the ramp rates associated with each.

Coated Particles

The result of the method of applying 300 of coating graphitic material are the coated particles 106 themselves, as shown in FIG. 1. The present invention is also directed to these coated particles 106. The coated particles 106 include a core of graphitic material, such as graphite, with a coating of coal tar pitch particles 102 as delivered by the aqueous dispersion 100 discussed above. The coated particles 106 may be assessed and characterized using various different spectrographic and petrographic techniques, such as but not limited to two-dimensional optical microscopy and three-dimensional microscopy, such as scanning electron microscopy, for visually assessing the coated particles for evidence of coal tar pitch on graphite, surface areas of the coating and the graphite, impurities, aggregates or clumping of coated particles or the pitch coating coagulating to itself, among others, and quantifying the size of the particles and coating; laser particle distribution for quantifying the size and respective population of the coated particles 106; BET specific surface area analyzer to quantify the surface areas of the coated particles 106, coating and graphite core, provided in units of area per mass of sample ($m^2/g$); Tap density tester to quantify the density of the coated particles 106 and their ability to further compact when tapped; and other methods.

The coal tar pitch coating may be substantially thinner than the graphitic core material of the coated particles 106. For instance, in at least one embodiment the coal tar pitch coating may be no more than 2.5 microns in thickness, as compared to the graphite core being about 10 microns in diameter. This is but one non-limiting example. Coating thickness may be measured by suitable methods.

The coal tar pitch coating of the coated particles 106 may only partially coat the graphitic core material in some embodiments, leaving some areas of the graphitic material exposed. These exposed areas of the graphitic material may be electrically conductive or otherwise available for reactions such as for use in a battery, such as but not limited to a Li-ion battery. In other embodiments, the coal tar pitch coating may coat the entirety or substantially the entirety of the graphitic material. The amount of coverage of the coating may be measured by BET surface area testing, such as may be quantified by SEM and associated computing programs. In at least one embodiment, the coated particles 106 have a BET surface area of less than 5 $m^2/g$, though in other embodiments the surface area is preferably less than 3 $m^2/g$. The coated particles 106 also have an increased tap density as compared to uncoated graphitic material. In some embodiments, the coated particles 106 may have an increased tap density of about 10-15% higher than the tap density of the uncoated graphitic material. In some embodiments, the coated particles 106 may have an increased tap density of about 20-25% higher than the tap density of the uncoated graphitic material. These are but a few non-limiting examples. The coated particles 106 produced by the methods 200, 300 and using the aqueous dispersion 100 described herein can be used to form negative electrodes for Li-ion batteries. Specifically, once the coated particles 106 are formed and carbonized, they may be pressed or formed into an electrode in any suitable shape, including but not limited to rod and sheet configurations, and by suitable methods, including but not limited to pressing and rolling. By shielding portions of the graphite within the electrode, the coal tar pitch coating of the coated particles 106 will reduce contamination and degradation of the electrode from components in the battery electrolyte upon discharge, extend life of electrode (and thus, the battery), and thereby increase the efficiency of the battery.

Electrodes made with the coated particles 106 produced by the methods 200, 300 and using the aqueous dispersion 100 described herein may be formed into batteries, such as but not limited to Li-ion batteries, whether coin cell, pouch, or larger sized. Such batteries have favorable electrochemical characteristics capable of use in the industry. For instance, coin cell batteries were made with electrodes made from the coated particles 106 as coated with the aqueous dispersion 100 and were tested through galvanostatic cycling, measuring voltage discharge and specific capacity with each cycle. As shown in Example 11, the dispersion 100 and resulting coated particles 106 are capable of producing a battery having a charge capacity of at least 360 mAh/g, though achieving less of a charge capacity is also possible. The charge capacity of a battery is the amount of charge a battery can hold when fully charged. Uncoated graphite has a theoretic maximum charge capacity of 372 mAh/g. The dispersion 100 and resulting coated particles 106 as described herein are therefore capable of producing batteries with a charge capacity in the range of 360-372 mAh/g, as described in Example 11 below.

Another measure of battery efficiency is the irreversible capacity loss, or ICL. The irreversible capacity (also referred to herein as discharge capacity) of a battery is the amount of energy a battery can release when discharged or used. Batteries will experience the most degradation with the first use cycle but will gradually self-discharge over time even when not in use. The discharge capacity of a battery directly impacts and limits its charge capacity, so the more discharge capacity a battery loses over time or cycles of use, the less longevity of the battery overall. The ICL is a measure of this loss of discharge capacity over repeated cycles of use.

Therefore, limiting the ICL over time will extend the life of the battery. An ICL of less than 7% is the industry standard for Li-ion batteries. The sample batteries made and tested here show that the dispersion 100 and resulting coated particles 106 as described herein are capable of producing batteries having an ICL of less than 7%, as shown in Example 11, thus meeting this standard.

EXAMPLES

The following Examples are provided to demonstrate experiments performed in determining various characteristics and parameters of the dispersion 100, method of making the same 200, method of applying the dispersion 300 and coated graphite particles 106.

Example 1

Milling Pitch Types

Figure 4:
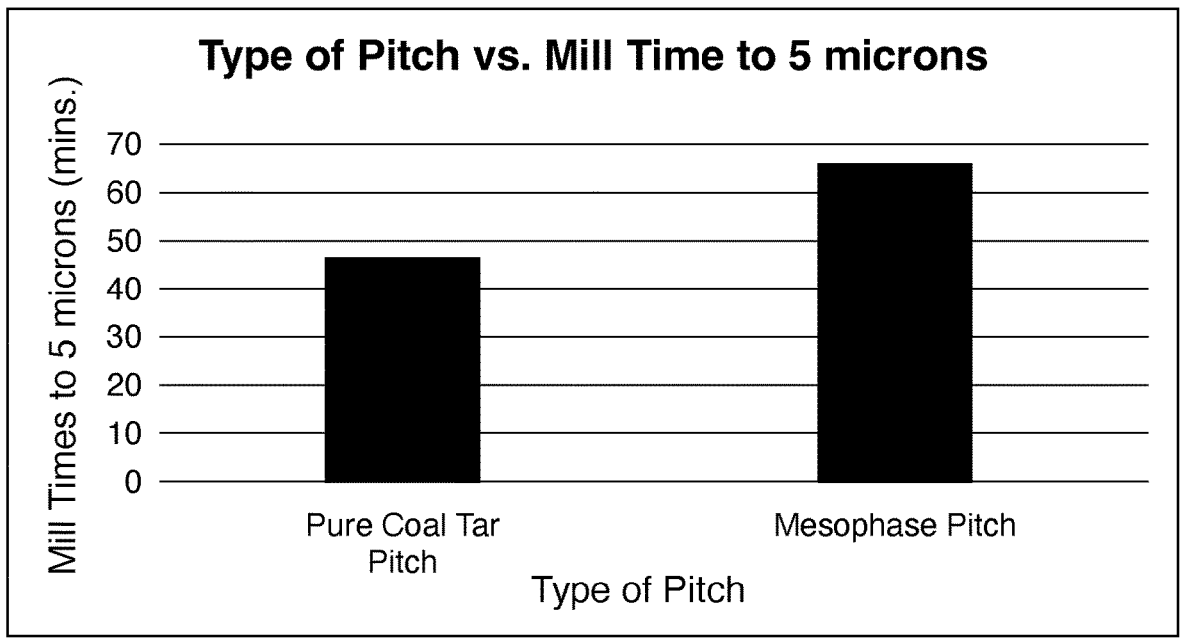
FIG. 4 is a graph of the milling time of different types of coal tar pitch, as described in Example 1.

Types of coal tar pitch were compared to see if there is any effect on time to mill the particles to D50<5 In a first sample, pure coal tar pitch having a softening point of 130° C. was combined with a mixture of 4.5% wt Class E, 4.5% wt Class F and 1% wt Class D as dispersant and deionized water to form a slurry containing 35% by weight pitch, 10% by weight dispersant, and remainder of weight deionized water. This slurry was added to an Anton Paar BM500 ball mill (Anton Paar GmbH of Austria) having 200 W power and dual milling cups each with a maximum capacity of 50 mL, and was milled at a speed of 30 Hz. Samples of the slurry were taken at 2-minute intervals and analyzed for size with an Anton Paar PSA 990 two-dimensional particle size analyzer (Anton Paar GmbH, Austria) having a single laser system capable of measuring from 0.2 µm to 500 µm for liquid dispersions and 0.3 µm to 500 µm for dry powders, which was and fitted with a stirred sample collector, peristaltic circulating pump for liquid samples and ultrasonic transducer generating ultrasonic waves to keep particles from clumping during operation. Milling continued until the slurry achieved D50<5 µm. The time elapsed between starting the milling and reaching D50<5 µm was tracked and is shown in FIG. 4.

In a second sample, a pitch being about 78% mosaic mesophase with no embryonic mesophase or mesophase spheres was combined with a mixture of 4.5% wt Class E, 4.5% wt Class F and 1% wt Class D as dispersant and deionized water to form a slurry containing 35% by weight mesophase pitch, 10% by weight dispersant, and remainder of weight deionized water. The slurry was added to a ball mill and milled as described above, except taking samples for size measurement at 4-minute intervals, until the composition reached D50<5 μm. The time elapsed between starting the milling and reaching D50<5 μm was tracked and is shown in FIG. 4.

The results of Example 1 shows that the presence of mesophase in the pitch increases the amount of time needed to mill the particles of the slurry to the desired D50<5 μm. In this case, it took 1.4 times longer to mill the mesophase sample as it did to mill the pure coal tar pitch sample.

Example 2

Effect of Softening Point on Milling Time

Figure 5:
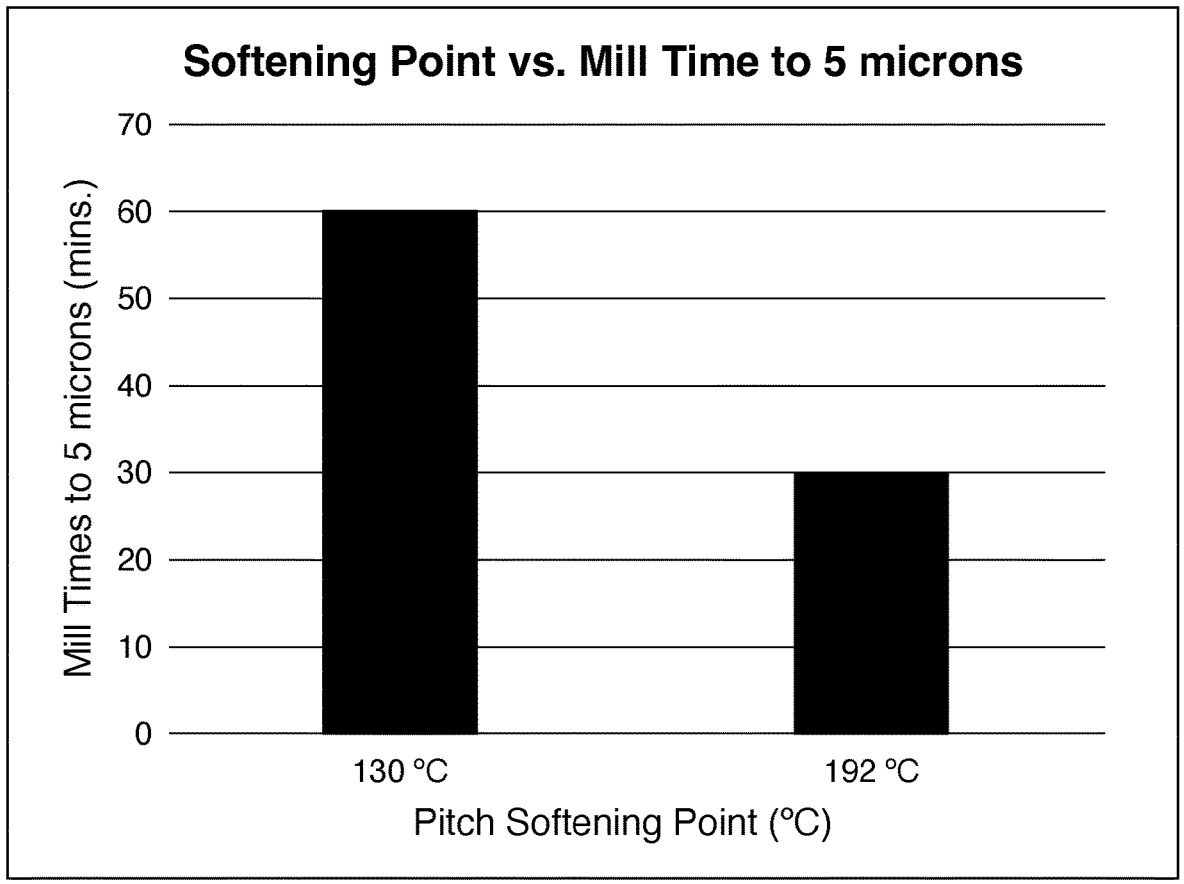
FIG. 5 is a graph of the milling time of coal tar pitch having different softening points, as described in Example 2.

Different softening points of coal tar pitch were compared to see if the softening point has any effect on the time to mill the particles to D50<5 μm. In a first sample, coal tar pitch having a softening point of 130° C. was combined with a mixture of 4.5% wt Class E, 4.5% wt Class F and 1% wt Class D as dispersant and deionized water to form a slurry containing 35% by weight pitch, 10% by weight dispersant, and remainder of weight deionized water. In a second sample, coal tar pitch having a softening point of 192° C. and about 3.5% mesophase pitch, including about 1.6% mesophase spheres ranging from 4-150 microns in size and 1.9% embryonic mesophase of up to 4 microns in size, was combined with a mixture of 4.5% wt Class E, 4.5% wt Class F and 1% wt Class D as dispersant and deionized water to form a slurry containing 35% by weight pitch, 10% by weight dispersant, and remainder of weight deionized water. For each sample, the slurry was added to a ball mill and milled as described in Example 1 (except taking samples for size measurement at 5-minute intervals) until the composition reached D50<5 μm. The time elapsed between starting the milling and reaching D50<5 μm was tracked and is shown in FIG. 5.

The results of Example 2 show that higher softening point pitches reduce the time to mill the particles to the desired D50<5 μm. It is possible the heat generated during milling may be enough to make low softening point pitch particles re-congeal into larger particles, leading to increased milling time, though this is only a theory.

Example 3

Effect of Amount of Coal Tar Pitch on Milling Time

Different amounts of pitch in the dispersion were investigated to see how the amount of pitch affected the time to mill the particles to D50<5 μm. Three samples were prepared combining coal tar pitch having a softening point of 130° C. with a mixture of Class E, Class F and Class D as dispersant and deionized water to form slurries with the following compositions:

TABLE 3

Figure 6:
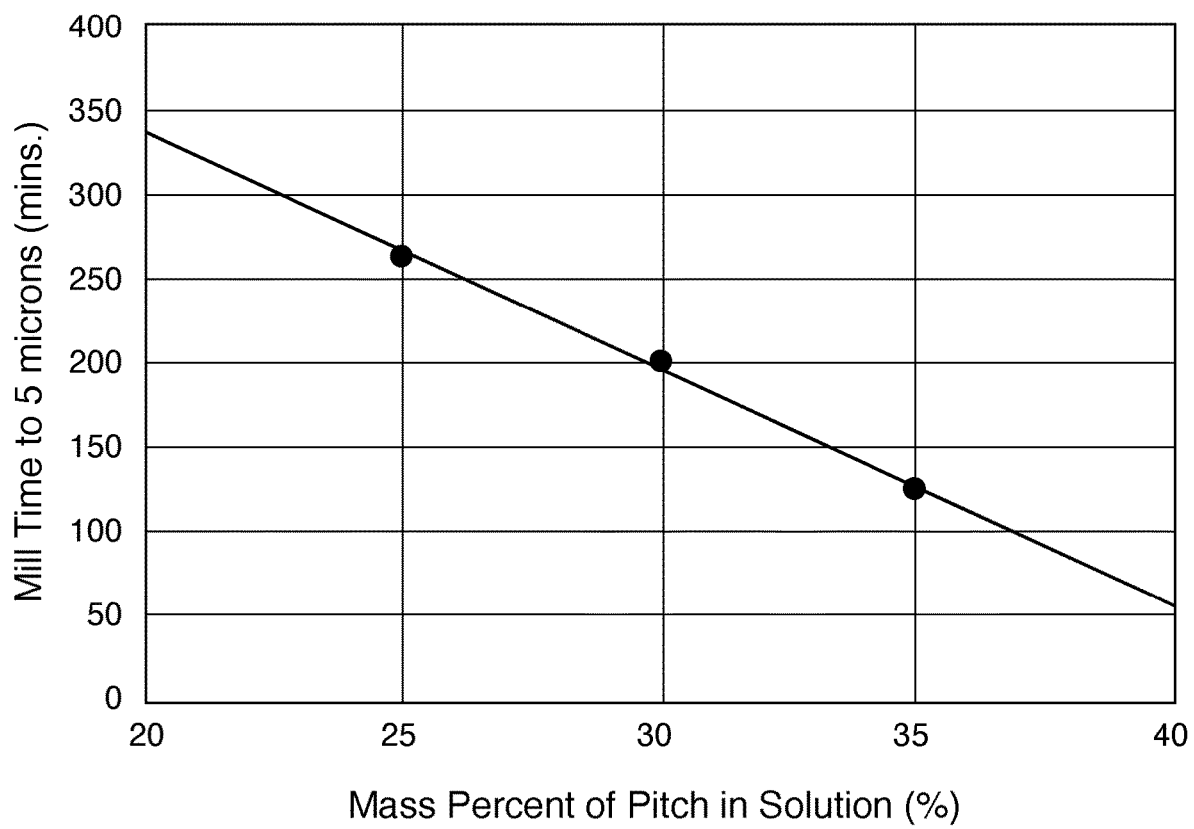
FIG. 6 is a graph of the milling time of the dispersion having different percentages of coal tar pitch, as described in Example 3.

| Coal tar pitch (% wt) | Class E | Class F | Class D | Total dispersant (% wt) |
|---|---|---|---|---|
| 25% | 4 | 4 | 0.25 | 8.25 |
| 30% | 4 | 4 | 0.25 | 8.25 |
| 35% | 4.5 | 4.5 | 1 | 10 | and the remainder of weight deionized water. Each sample was separately added to a ball mill and milled as described in Example 1, taking samples for size measurement by a particle size analyzer at 5-minute intervals until the composition reached D50<5 μm. The time elapsed between starting the milling and reaching D50<5 μm was tracked and is shown in FIG. 6.

The results of Example 3 show that formulations with a higher mass percentage of pitch actually faster than those with a lower mass percentage pitch. However, formulations having 40% pitch were also investigated but were too thick and paste-like to be handled easily. Therefore, 35% pitch was determined to be optimal, at least using this dispersant mixture.

Example 4

Effect of Amount of Dispersant on Milling Time

Various amounts of dispersant were also investigated to see their effect on time to mill the particles to D50<5 μm. Specifically, samples were made combining coal tar pitch having a softening point of 130° C. with a mixture of Class E, Class F and Class D as dispersant and deionized water to form slurries containing the following formulations and remainder of weight deionized water:

TABLE 4

| Pitch | Dispersant Class E | Dispersant Class F | Dispersant Class D | Total Dispersant |
|---|---|---|---|---|
| 30% | 4.0% | 4.0% | 1.0% | 9% |
| 30% | 4.0% | 4.5% | 1.0% | 9.5% |
| 30% | 5.0% | 5.0% | 1.0% | 11% |
| 25% | 4.0% | 4.0% | 0.25% | 8.25% |

Figure 7:
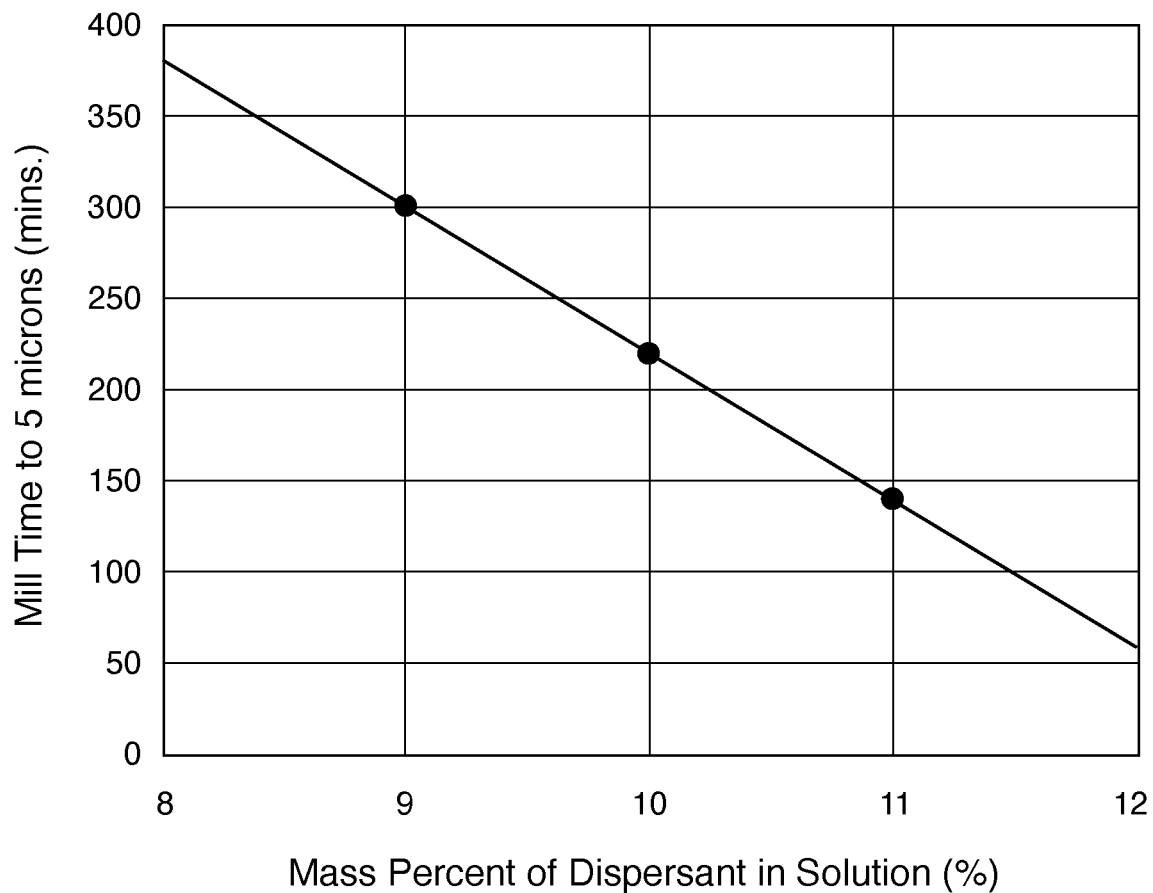
FIG. 7 is a graph of the milling time of the dispersion having different amounts of dispersant, as described in Example 4.

Each sample was separately added to a ball mill and milled as described in Example 1, taking samples for size measurement by a particle size analyzer at 5-minute intervals until the composition reached D50<5 μm. The time elapsed between starting the milling and reaching D50<5 μm was tracked. The results for the samples having 9%, 9.5% and 11% dispersant are shown in FIG. 7.

The results show that increasing the amount of dispersant in the slurry mill faster than those with less dispersant. However, increasing the amount of dispersant also increases the foaminess of the slurry upon milling, leading to difficulties in determining particle size by particle size analyzer. Specifically, samples having more than 11% dispersant produced an amount of foaminess or bubbles in the slurry that interfered with the ability to size the particles by particle size analyzer. Therefore, it was determined that 10% dispersant is optimal when using a blend of Class E, Class F and Class D as the dispersant. Other dispersants may have different characteristics and therefore lead to different optimal percentages in the aqueous dispersion or slurry.

Example 5

Effect of Number of Balls on Milling Time

Figure 8:
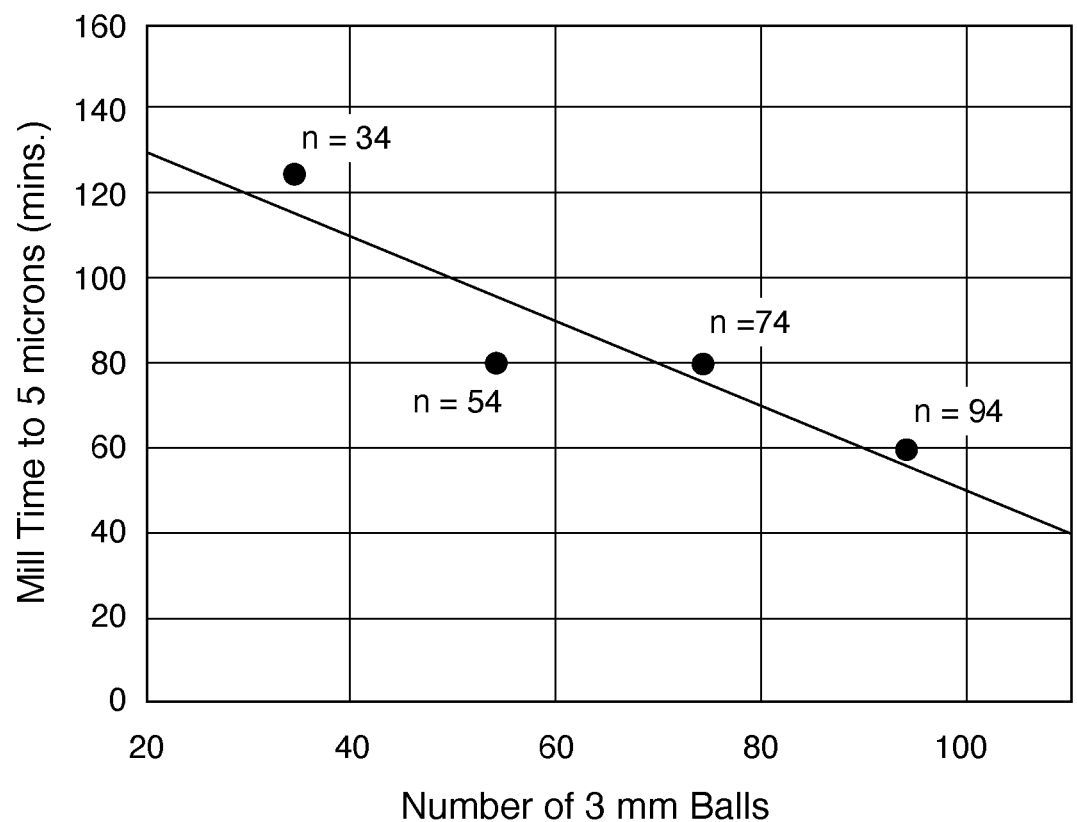
FIG. 8 is a graph of the milling time of the dispersion using different numbers of milling balls, as described in Example 5.

The number of balls used in the wet milling process were also investigated to see if the number affected milling rate. Specifically, samples of the dispersion slurry were made combining coal tar pitch having a softening point of 130° C. with a mixture of 4.5% wt Class E, 4.5% wt Class F and 1% wt Class D as dispersant and deionized water to form slurries containing 35% by weight pitch, 10% by weight dispersant, and remainder of weight deionized water. Each sample was separately added to the ball mill as described above in Example 1, with 3 mm sized stainless steel balls of various amounts: either 34 balls, 54 balls, 74 balls or 94 balls. The dispersions were milled as described in Example 1, taking samples for size measurement by a particle size analyzer at 5-minute intervals until the composition reached D50<5 μm. The time elapsed between starting the milling and reaching D50<5 μm was tracked. The results for the samples are shown in FIG. 8.

The results show that faster milling times are achieved when using higher numbers of balls for milling. However, using more milling balls reduces the amount of dispersion that will fit in the volume of the ball mill for processing. For example, the Anton Paar BM50 ball mill discussed in Example 1 was also used in this Example 5 has two milling capsules with a combined maximum capacity of 37.4 mL volume, including dispersion and milling balls. However, using smaller sized balls or a larger capacity mill would allow more balls to be used, additional amounts of dispersion for processing at a time, and/or further decrease the time to mill to D50<5 μm. For example, mills or grinders on a commercial or industrial scale can accommodate larger capacity volumes, more balls and different sized balls.

It should be noted that the same composition of pitch was milled with 5 mm sized balls in additional experiments. Those results are not shown here, but the 3 mm sized balls were able to mill the dispersions to D50<5 μm faster than the 5 mm sized balls. The smaller the milling ball used, the smaller the resulting particle size can be achieved, typically about 1/1000 of the diameter of the milling balls used.

Example 6

Coating Graphite Using 12% Pitch to Graphite Mixture

Various ratios of coal tar pitch dispersion to graphite particles were investigated for ability to coat the graphite particles in an application of the dispersion. In a first experiment, explained here in Example 6, a coal tar pitch dispersion being 12% pitch (softening point 130° C.), 8.25% dispersant as a mixture of 4% wt Class E, 4% wt Class F and 0.25% wt Class D, and remainder deionized water was wet milled using 3 mm stainless steel milling balls until the coal tar pitch in the dispersion had reached a D50<5 μm. This dispersion was combined with an amount of natural graphite particles having a diameter of about 10 μm shown below, resulting in the following 12% pitch to graphite ratio composition:

TABLE 5

| Ingredient | Amount (grams) | Notes |
| --- | --- | --- |
| 22.61% coal tar pitch dispersion | 9.05 | includes 2.05 g pitch |
| Graphite particles (natural) | 15 | |
| DI water | 10.19 | added while mixing but is later removed during drying and carbonization so it does not affect the overall percentage |
| TOTAL | 34.24 | 12% pitch to graphite ratio |

These ingredients were combined in a beaker and stirred by hand with a glass rod at ambient temperature (<29.44° C.) to mix the pitch dispersion with the graphite particles. The solution was poured onto a stainless steel foil boat and spread evenly with a small paint brush and stone roller to achieve a thin, even coating on the foil.

The foil with the solution was placed in a furnace and heated for carbonization according to the following protocol:

TABLE 6

| | Start Temp (° C.) | End Temp (° C.) | Rate (° C./min) | Soak (min) | Total Time (min) | Time (hrs) |
| --- | --- | --- | --- | --- | --- | --- |
| Step 1 - Ramp | ambient | 80 | 2.0 | | 27.5 | |
| Step 2 - Soak | | 80 | | 30 | 30 | |
| Step 3 - Ramp | 80 | 300 | 1.0 | | 220 | |
| Step 4 - Ramp | 300 | 575 | 0.5 | | 550 | |
| Step 5 - Soak | | 575 | | 5 | 5 | |
| Step 6 - Ramp | 575 | 1000 | 7.5 | | 56.7 | |
| Step 7 - Soak | | 1000 | | 30 | 30 | |
| TOTAL | | | | | 919.2 | 15.3 |

In step 1, the furnace temperature was increased to 80° C. which was held for 30 minutes to dry the mixture and remove the deionized water. The sample appeared to be dry upon inspection after step 2. After initial drying, the temperature was ramped up in stages to 1000° C. which was maintained for 30 minutes to achieve carbonization in which the coal tar pitch particles from the dispersion were adhered to the graphite particles. Once carbonization was completed, the furnace was allowed to cool naturally until below 100° C.

Once below 100° C., the foil boat was removed from the furnace and the contents were analyzed. There was a roughly 1/16-inch-thick platelike crust in the foil boat which broke apart easily when picked up. This material was examined under two-dimensional dry optical microscopy (nothing added to the sample) and wet optical microscopy (adding a drop of oil to enable increased magnification) at ×600, ×1200 and ×1600 magnifications using a Reflected Polarized Light Universal microscope (Ziess of Oberkochen, Germany) having a magnification range of 65×-1600×, though other equivalent industry standard instrumentation could also be used. Optical light activity was observed to visually distinguish coal tar pitch particles from graphite, to assess coating effect. The results of this experiment were inconclusive, being unable to distinguish coal tar pitch particles and graphite particles. It appeared that some of the pitch coagulated together.

Example 7

Coating Graphite Using 16% Pitch to Graphite Mixture

In a second experiment, a higher ratio of pitch to graphite was tested. Here, a coal tar pitch dispersion being 35% pitch (softening point 130° C.), 10% dispersant as a mixture of 4.5% wt Class E, 4.5% wt Class F and 1% wt Class D, and remainder deionized water was wet milled using 3 mm stainless steel milling balls until the coal tar pitch in the dispersion had reached a D50<5 μm. This dispersion was combined with an amount of natural graphite particles having a diameter of about 10 μm shown below, resulting in the following approximately 16% pitch to graphite ratio composition:

TABLE 7

| Ingredient | Amount (grams) | Notes |
| --- | --- | --- |
| 35% coal tar pitch dispersion | 22.38 | includes 7.833 g pitch |
| Graphite particles | 47.14 | |
| DI water | 20.44 | added while mixing but is later removed during drying and carbonization so it does not affect the overall percentage |
| TOTAL | 89.96 | 16.62% pitch to graphite ratio |

Since the pitch particles in the dispersion had settled, the pitch dispersion was sonicated with an ultrasound sonicator for about 5 minutes until the particles were suspended in solution and the dispersion was pourable. The dispersion, graphite particles and deionized water were added to a graduated cylinder and mixed with a shear mixer inserted into the graduated cylinder from above at speeds ranging from 100-1600 rpm, beginning with the low speed and increasing the speed to a maximum of 1600 rpm as additional material became suspended in solution, until all the solid material was off the bottom of the cylinder to mix the pitch dispersion with the graphite particles. Additional deionized water was added as needed during the mixing to keep the solution from becoming too thick and to facilitate mixing. The mixing was performed at ambient temperature (<29.44° C.) until all solid particles were visually observed as suspended in the solution. The solution was poured onto a ¼ inch thick stainless steel plate which was coated with a flexible stainless steel foil. A paint brush was used to evenly spread the solution around the foil.

The foil with plate and solution was placed in a furnace and heated for carbonization according to the following protocol:

TABLE 8

| | Start Temp (° C.) | End Temp (° C.) | Rate (° C./min) | Soak Time (min) | Total Time (min) | Time (hrs) |
| --- | --- | --- | --- | --- | --- | --- |
| Step 1 - Ramp | ambient | 80 | 2.0 | | 27.5 | |
| Step 2 - Soak | | 80 | | 45 | 45 | |
| Step 3 - Ramp | 80 | 300 | 1.0 | | 220 | |
| Step 4 - Ramp | 300 | 575 | 0.5 | | 550 | |
| Step 5 - Soak | | 575 | | 5 | 5 | |
| Step 6 - Ramp | 575 | 1000 | 7.5 | | 56.7 | |
| Step 7 - Soak | | 1000 | | 30 | 30 | |
| TOTAL | | | | | 934.2 | 15.6 hrs |

This heating and carbonization protocol is largely as described above in Example 6 except that here the sample was checked at 15 minutes and 30 minutes of the soaking step 2 to determine when the material was dry, which was observed at 30 minutes when the material no longer had a glossy liquid layer upon visual inspection. At this point, a second ⅜-inch stainless steel plate was placed on top of the material to compress the material in an attempt to keep the coal tar pitch molecules in contact with the graphite particles during carbonization. Carbonization continued according to the protocol. Once the protocol was completed, the furnace was allowed to cool naturally until below 100° C.

Once below 100° C., the foil boat with steel plates and material was removed from the furnace and the contents between the plates were analyzed. There was a roughly 1/16-inch-thick platelike crust in the foil boat which broke apart easily when picked up and was free-flowing when removed from the foil boat and plates. This material was examined under two-dimensional dry and wet optical microscopy as described above in Example 6. These results were also inconclusive.

Example 8

Graphite Coating Experiments with Natural Graphite

In further studies, a sample of the coal tar pitch dispersion was sent to American Energy Technologies Co., a third-party laboratory, which performed additional application/coating techniques and analyzed the results by additional methods and instrumentation. Specifically, a sample of 28% pitch dispersion (having 28% coal tar pitch with 130° C. softening point, 8.25% dispersant as a mixture of 4% wt Class E, 4% wt Class F and 0.25% wt Class D, and the remainder deionized water) was sent to American Energy Technologies Co. where it was combined with dry spheroidal natural graphite in an 11% pitch to graphite ratio, vortexed in a high shear mixer to mix the dispersion with the natural graphite particles, and then carbonized by heat treatment according to proprietary techniques.

Figure 9:
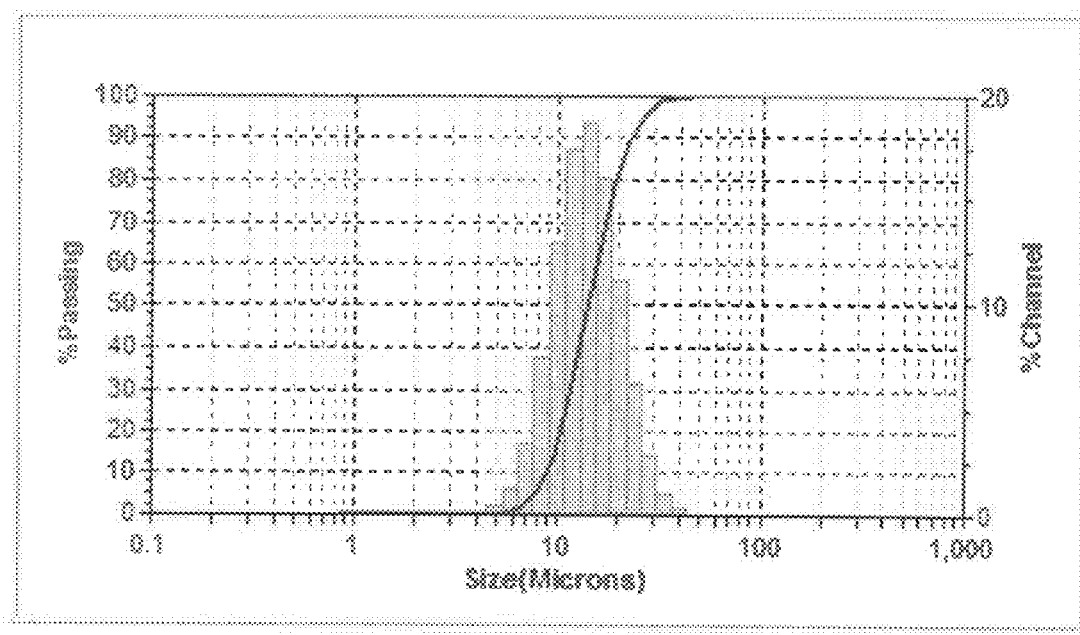
FIG. 9 is a graph of the particle size distribution of coated particles as described in Example 8.
Figure 10A:
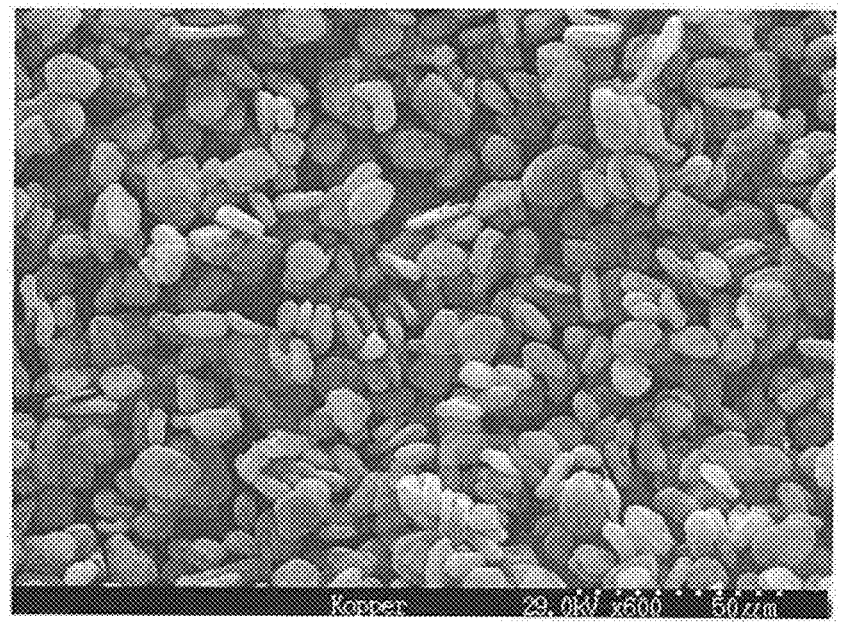
FIG. 10A is an SEM image of the coated particles as described in Example 8, taken at ×600 magnification.
Figure 10B:
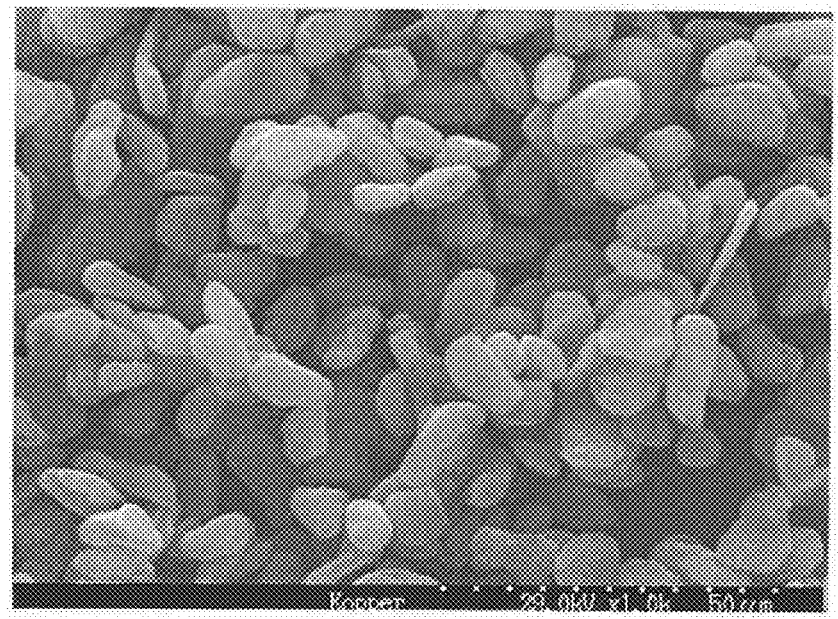
FIG. 10B is an SEM image of the coated particles as described in Example 8, taken at ×1000 magnification.
Figure 10C:
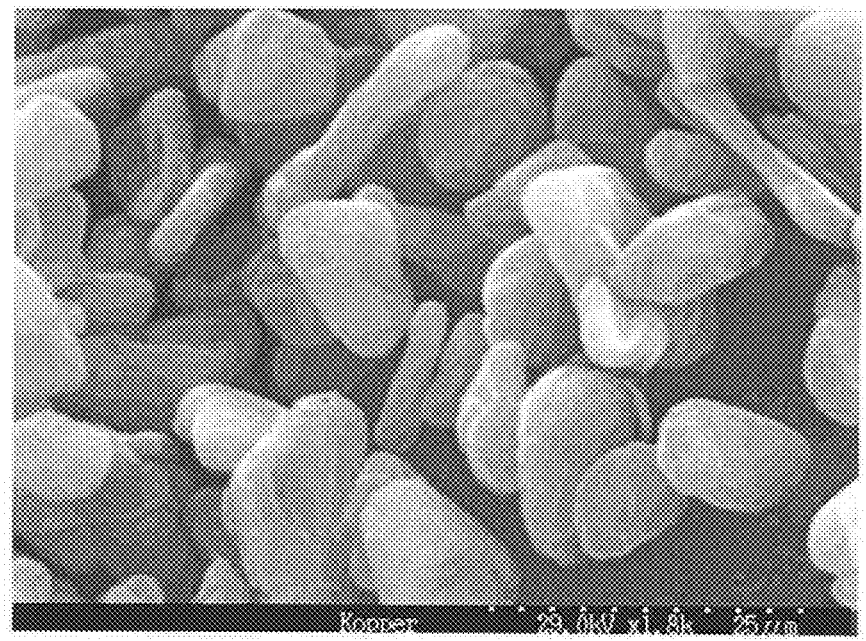
FIG. 10C is an SEM image of the coated particles as described in Example 8, taken at ×1800 magnification.
Figure 10D:
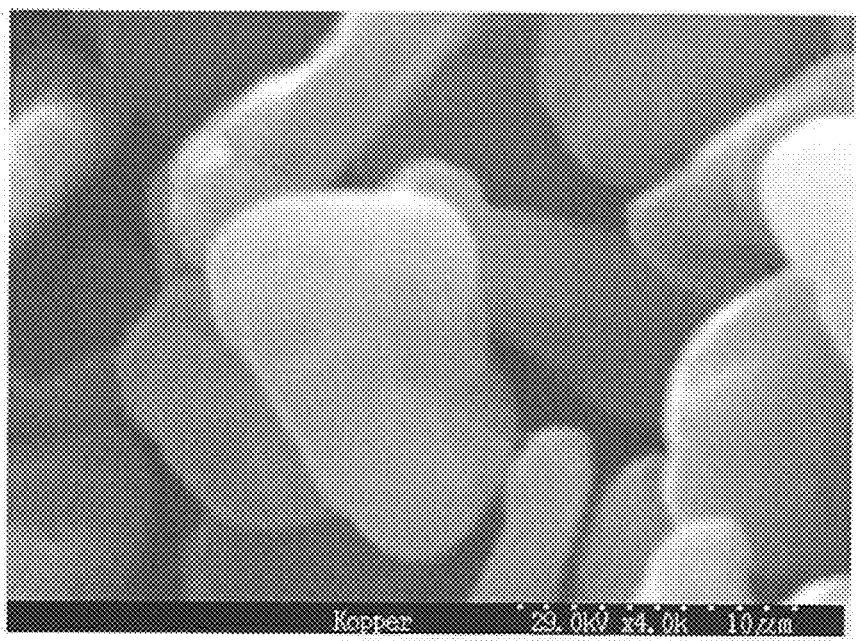
FIG. 10D is an SEM image of the coated particles as described in Example 8, taken at ×4000 magnification.

The resulting coated graphite particles were analyzed by particle size analyzer for laser particle size distribution. The particle size analysis by laser distribution showed 93% of the coated particles passing through a 450-mesh sieve, and a bell-curve distribution of sizes ranging from 6-40 μm, with the majority being between about 10-25 μm in size, as shown in FIG. 9. Specifically, the coated particles exhibited the following sizes and distributions, as compared to raw, uncoated natural spheroidal graphite:

TABLE 9

| | D10 (μm) | D50 (μm) | D90 (μm) | Mean Value (μm) |
| --- | --- | --- | --- | --- |
| Coated Particles (11% wt pitch to graphite) | 8.87 | 13.91 | 22.32 | 14.90 |
| Natural Graphite (uncoated) | 7.74 | 11.35 | 17.47 | 12.26 |

The comparison shows the coated particles were effectively coated, increasing the particle size as compared to the uncoated raw graphite particles. These data indicate a higher level of this pitch is possible.

The resulting coated particles were also analyzed by three-dimensional scanning electron microscopy (SEM) at ×600, ×1000, ×1800 and ×4000 magnifications. The SEM analysis showed smooth coating of the graphite particles at all magnifications, shown in FIGS. 10A, 10B, 10C and 10D, respectively.

The BET surface area, an indication of surface area of the graphite particles coated with the coal tar pitch, was assessed by an AutoFlow BET+surface area analyzer (Quantachrome Instruments of Boynton Beach, Fla.), although other equivalent industry standard instrumentation could also be used. The analysis revealed the BET surface area for the coated particles were 3.79 m$^2$/g as compared to uncoated natural graphite particles which had a BET surface area of 8.04 m$^2$/g. This confirms the coating adhered to the surface of the natural graphite particles, providing a significant reduction in the surface area of the coated particles.

The resulting coated particles were also analyzed for tap density, as a test for eventual battery efficiency, using an Autotap instrument (Anton Paar GmbH of Austria), although other equivalent industry standard instrumentation could also be used. The tap density in the coated graphite particles did not increase, being at 0.835 as compared to 0.834 of the uncoated graphite particles.

Taken together, these results indicate the aqueous coal tar pitch dispersion is capable of coating and adhering to natural graphite particles to successfully form a coated particle.

Example 9

Graphite Coating Experiments with Synthetic Graphite

American Energy Technologies Co. also conducted further experiments with the same aqueous dispersion as in Example 8 (28% pitch dispersion having 28% coal tar pitch with 130° C. softening point, 8.25% dispersant as a mixture of 4% wt Class E, 4% wt Class F and 0.25% wt Class D, and the remainder deionized water), this time combined with dry synthetic spheroidal graphite particles, also in a 11% pitch to graphite ratio. The same techniques for combining, mixing and carbonization used in Example 8 were also used in this Example 9. The resulting coated graphite particles were analyzed for particle size, distribution, SEM, BET surface area and tap density, as described in Example 8 except where noted below.

Figure 11:
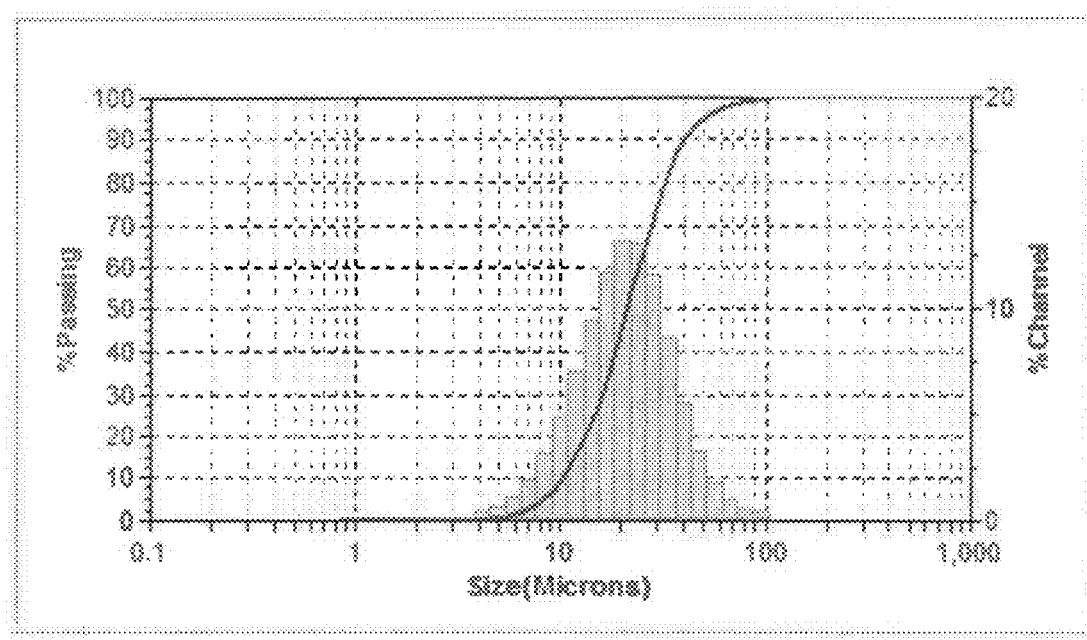
FIG. 11 is a graph of the particle size distribution of coated particles as described in Example 9.
Figure 12A:
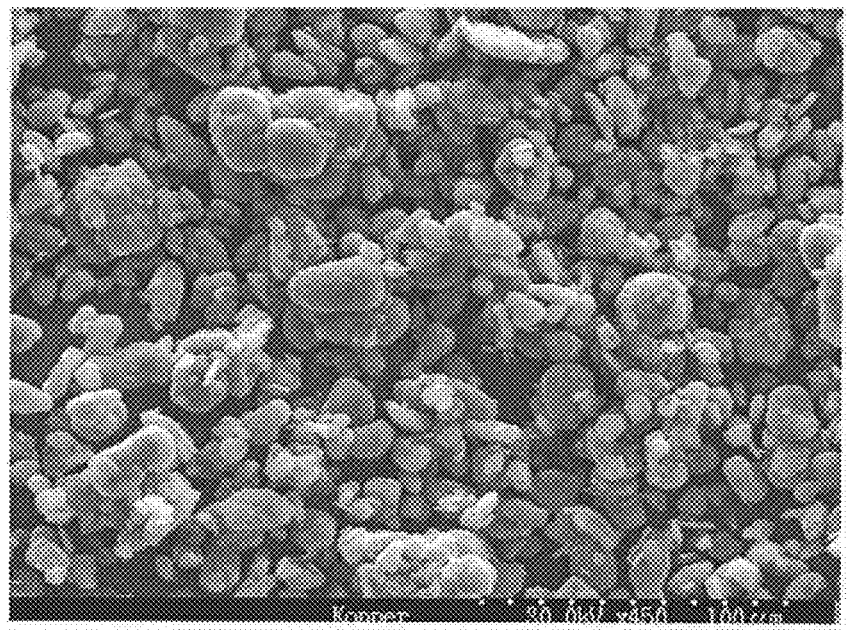
FIG. 12A is an SEM image of the coated particles as described in Example 9, taken at ×450 magnification.
Figure 12B:
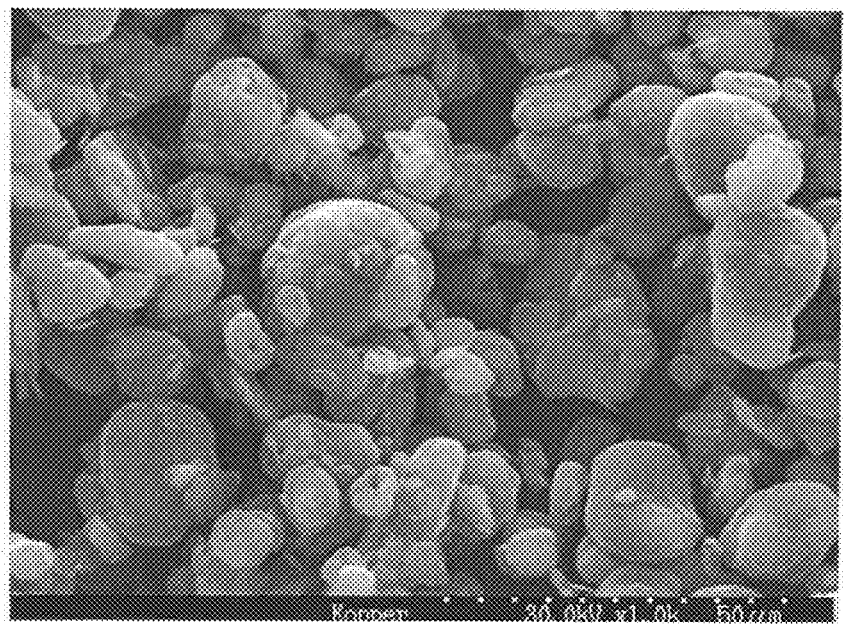
FIG. 12B is an SEM image of the coated particles as described in Example 9, taken at ×1000 magnification.
Figure 12C:
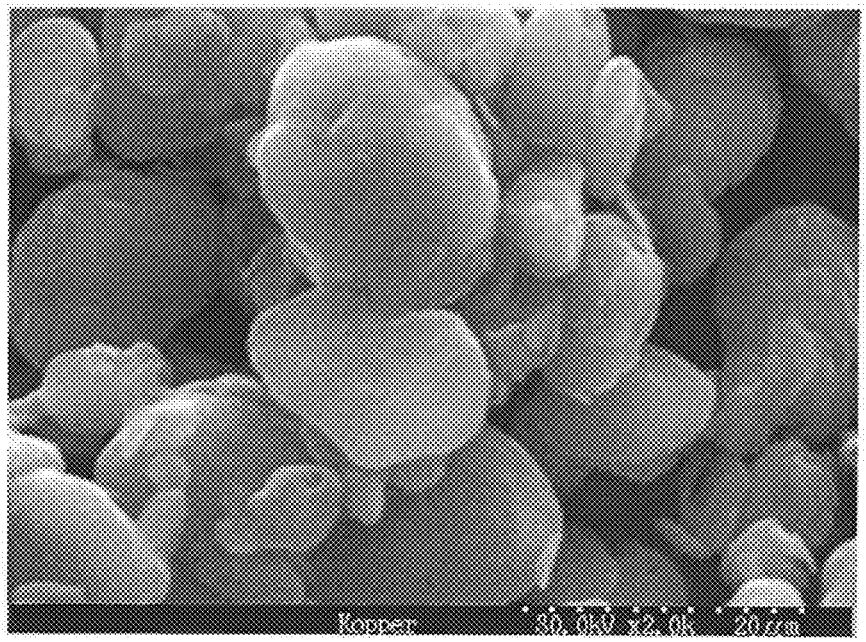
FIG. 12C is an SEM image of the coated particles as described in Example 9, taken at ×2000 magnification.
Figure 12D:
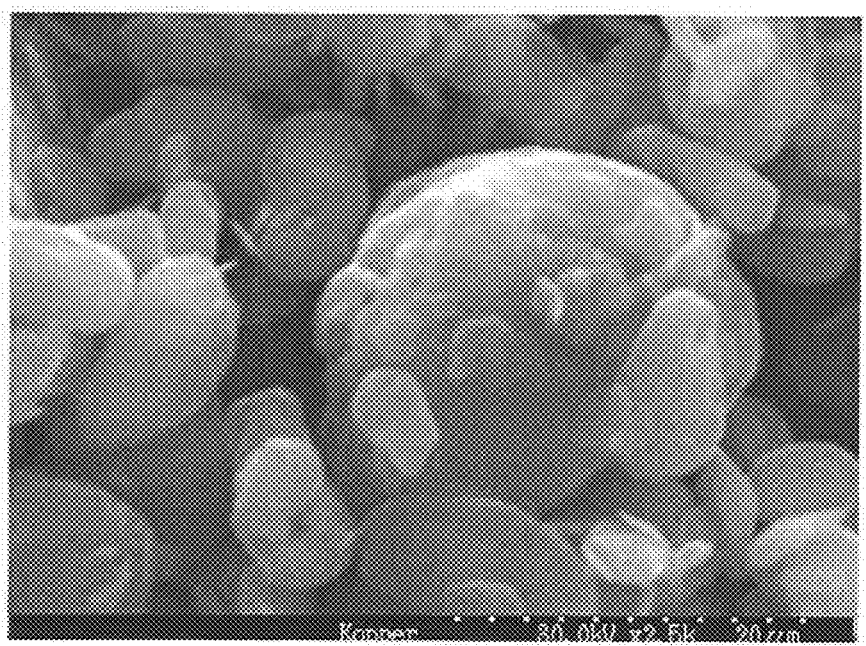
FIG. 12D is an SEM image of the coated particles as described in Example 9, taken at ×2500 magnification.

A laser distribution of the synthetic graphite coated particles showed about 93% of the coated particles passing through a 450-mesh sieve, and a bell-curve distribution of sizes as shown in FIG. 11. The size distribution of the coated particles is as follows:

TABLE 10

| | D10 (μm) | D50 (μm) | D90 (μm) | Mean Value (μm) |
|---|---|---|---|---|
| Coated Particles (11% wt pitch to synthetic graphite) | 10.22 | 20.96 | 39.86 | 23.72 |

Size and distribution of the raw, synthetic graphite particles was not provided for comparison. However, these results show a good size and distribution of the coated particles The resulting coated particles were also analyzed by SEM microscopy at ×450, ×1000, ×2000 and ×2500 magnifications. The SEM analysis showed clear accumulation of coating particles on the synthetic graphite at all magnifications, shown in FIGS. 12A, 12B, 12C and 12D, respectively.

The BET surface area analysis of the coated synthetic particles was 2.12 m$^2$/g. Though a comparison to the uncoated synthetic graphite was not provided, this BET score is less than 3 m$^2$/g and is an excellent value. It indicates the surface area is significantly reduced upon coating with the aqueous dispersion, even more so when using synthetic graphite as compared to natural graphite in Example 8.

The tap density analysis revealed a tap density of 1.08 g/cm3. Again, there was no uncoated synthetic particle measurements provided for comparison but as compared to the coated natural particles of Example 8, this is an increase and a significant improvement.

Taken together, these results indicate the aqueous coal tar pitch dispersion is capable of coating and adhering to synthetic graphite particles as well to successfully form a coated particle. Though just one data point, the results of Example 9 might even suggest improved results may be obtained when using synthetic versus natural graphite particles. The reasons for this are still unknown.

Example 10

Coating Comparisons

Four samples of 10-12 μm spherical natural graphite were coated with aqueous dispersions for further assessment. A first aqueous coal tar pitch dispersion having a composition of 50% pitch (softening point 132° C.), 13% dispersant as a mixture of 4.5% wt Class D (preferably ZETASPERSE® 3100 in at least one embodiment), 7.5% wt Class F (preferably ZETASPERSE 179 in at least one embodiment), 1% wt Class G (preferably SURFYNOL® 104H in at least one embodiment), and the remainder deionized water was mixed at 650 rpm for 40 minutes. The mixture was added to a planetary mill and was wet milled with 1000 3 mm balls and 100 5 mm balls for 90 minutes. The size distribution of the pitch particles in the resulting dispersion was assessed by particle size analyzer and was found to have a distribution of D50 of 1.98 μm and D90 of 5.77 μm. This dispersion was applied to 10-12 μm natural graphite spheres at weight percent loadings of 8 wt. % pitch to graphite and 11 wt. % pitch to graphite as described below.

A second aqueous coal tar pitch dispersion having a composition of 50% pitch (softening point 130° C.), 15% dispersant as a mixture of 7.5 wt. % Class E (preferably TEGO® 750 in at least one embodiment), 7.5 wt. % Class F (preferably TEGO® 760 in at least one embodiment), 3 wt. % Class D (preferably TEGO® WET in at least one embodiment) and the remainder deionized water was mixed and milled as described above. The resulting pitch dispersion had a particle distribution of D50 of 3.030 μm and D90 of 5.666 μm. This dispersion was applied to 10-12 μm natural graphite spheres at weight percent loadings of 14 wt. % pitch to graphite and 18 wt. % pitch to graphite.

After application of the respective dispersions to graphite, the coated graphite particles were dried at 90° C. for 2 hours, then heat treated at 1450° C. in nitrogen. The treated precursors were screened using a 450-mesh sieve and tested for size distribution (D10, D50, D90 and mean value), loss on ignition (LOI), tap density, Scott volume and BET surface area. The data are presented below in Table 11 compared to an uncoated natural graphite control.

TABLE 11

|  | 8 wt. % | 11 wt. % | 14 wt. % | 18 wt. % | uncoated |
|---|---|---|---|---|---|
| D10 (μm) | 6.7 | 7.2 | 5.0 | 4.9 | — |
| D50 (μm) | 11.1 | 10.9 | 8.8 | 8.7 | 12.3 |
| D90 (μm) | 18.2 | 15.1 | 14.4 | 15.1 | — |
| Mean Value (μm) | 11.9 | 11.1 | 14.6 | 16.9 | — |
| LOI (wt. % C) | — | — | 99.99 | 99.99 | 99.97 |
| Tap Density (g/cc) | 1.09 | 1.09 | 1.07 | 1.09 | 0.88 |
| Scott Volume (g/cc) | 0.65 | 0.67 | 0.68 | 0.68 | 0.50 |
| BET Surface Area (m$^2$/g) | 2.76 | 2.43 | 2.54 | 1.4 | 8.0 |

The 14 wt. % and 18 wt. % samples were prepared and tested initially. Based on the resulting data, the 8 wt. % and 11 wt. % samples were prepared and tested to see if similar results could be obtained with less pitch. The tap densities of the samples were assessed by Autotap. The tap density in the coated graphite particles increased, being 1.09 g/cc or 1.07 g/cc as compared to 0.88 g/cc of typical uncoated natural graphite particles, providing an increase in tap density of 23.8% or 21.5%, respectively. This indicates the coated particles provide more battery efficiency than uncoated particles. The weight percent loading of pitch to graphite did not seem to have a significant effect on tap density.

The BET scores are less than 3 m$^2$/g and are excellent values. Compared to the 8.0 m$^2$/g of typical uncoated graphite particles, it indicates the surface area is significantly reduced upon coating with the aqueous dispersion.

Example 11

Battery Tests of Coating Comparisons

The coated graphite particles of each of the four weight percent loading levels from Example 10 were made into coin cell batteries for testing their electrochemical and cycling properties. Specifically, each batch from Example 10 was dispersed into a slurry and coated onto copper foil using a drawdown technique to create an electrode for each batch. The electrodes were dried under vacuum and weighed before being welded to the bottom can of a stainless-steel test cell of standard size (CR2016) to create 2 to 3 coin cell batteries for each batch. The coin cell batteries were then tested for reversible capacity (also referred to herein as charge capacity, absorption capacity or energy capacity), irreversible capacity (also referred to herein as discharge capacity), and irreversible capacity loss (ICL) over 100 cycles of charge/discharge. The results of the initial cycle 1 are shown below in Table 12.

TABLE 12

First cycle capacity.

| Batch | Cell | Charge Capacity (mAh/g) | Discharge Capacity (mAh/g) | ICL (%) |
|---|---|---|---|---|
| 8 wt. % | Cell 1 | 381.43 | 349.64 | 8.33% |
|  | Cell 2 | 379.94 | 348.56 | 8.26% |
| 11 wt. % | Cell 1 | 383.51 | 354.41 | 7.59% |
|  | Cell 2 | 383.73 | 354.29 | 7.67% |
| 14 wt. % | Cell 1 | 385.21 | 360.76 | 6.35% |
|  | Cell 2 | 388.36 | 361.42 | 6.94% |
| 18 wt. % | Cell 1 | 388.61 | 363.56 | 6.45% |
|  | Cell 2 | 388.86 | 363.13 | 6.62% |

Pure graphite has a theoretical maximum specific capacity of 372 mAh/g. It is preferred that the aqueous dispersions as described herein be capable of producing batteries having reversible capacities of 360 mAh/g or greater on the first initial charge, though lower capacities may also be useful and/or beneficial depending on the commercial application for the battery. As shown above in Table 12, the graphite particles coated with the aqueous dispersions in all pitch to graphite loads produced cell batteries capable of meeting or exceeding the desired 360 mAh/g in charge capacity.

It is preferred that irreversible capacity loss be as minimal as possible, while recognizing that some loss is unavoidable. For instance, for Li-ion batteries it is preferred that the ICL be less than 7% if possible. The results in Table 12 demonstrate that graphite particles coated with aqueous dispersions in 14 wt. % and 18 wt. % pitch to graphite loads produced cell batteries capable of having ICL values less than 7%, while those with only 8 wt. % or 11 wt. % loads produced cell batteries having ICL values higher than 7%. These data indicate that there may be lower limits to the amount of pitch in the coating required to withstanding ICL on discharge sufficiently for commercialization.

The discharge capacities of each sample cell battery were tested over 100 cycles, which is the typical life of a coin cell battery. These results are shown in Table 13.

TABLE 13

Discharge capacity by cycles.

| Batch | Cell | Cycles | | | | |
|---|---|---|---|---|---|---|
|  |  | 1 | 10 | 20 | 60 | 100 |
| 8 wt. % | Cell 1 | 349.64 | 339.53 | 330.96 | 302.16 | 277.09 |
|  | Cell 2 | 348.56 | 340.14 | 332.37 | 306.62 | 282.14 |
| 11 wt. % | Cell 1 | 354.41 | 348.93 | 343.43 | 320.6 | 305.69 |
|  | Cell 2 | 354.29 | 344.22 | 335.98 | 308.19 | 282.99 |
| 14 wt. % | Cell 1 | 360.76 | 350.17 | 345.22 | 319.16 | 290.59 |
|  | Cell 2 | 361.42 | 350.89 | 345.93 | 321.58 | 297.74 |
| 18 wt. % | Cell 1 | 363.56 | 354.78 | 351.97 | 333.72 | 315.19 |
|  | Cell 2 | 363.13 | 353.8 | 347.27 | 325.3 | 302.05 |

Example 12

Dispersant Characterizations

Various dispersants were tested at various different percentages for feasibility of use in an aqueous dispersion of coal tar pitch. Coal tar pitch having various softening points were combined with the indicated dispersants at the indicated percent concentration in aqueous solution to achieve dispersions being 50 wt. % coal tar pitch, half the percentage of active dispersant agent as indicated in Table 14 below and the balance deionized water. Each sample was wet milled for the indicated time in a Pulverisette planetary mill (Fritsch, Germany), producing particles having the indicated initial size distributions (D90, D50, D10) as assessed by Partica laser scattering particle size distribution analyzer (Horiba, Ltd., Japan), shown in Table 15. After milling, each sample was assessed for settling. Each sample was allowed to sit undisturbed for 28 consecutive days and each day the amount of sediment at the bottom of the container and separated solution were measured against graduations in the container by visual assessment. The final measurements are provided below in Table 17. Each sample was then resuspended by shaking in a paint shaker at 700 cycles per minute for the indicated time. The particle sizes were again measured by particle size analyzer, shown in Table 15 as final measurements, to confirm whether the dispersion contained aggregates.

TABLE 14

Dispersion characteristics

| Sample | Dispersant | Milling Time (min) | Pitch Softening Point (° C.) |
|---|---|---|---|
| 1 | 20% Class A | 30 | 132 |
| 2 | 20% Class B | 30 | 132 |
| 3 | 20% Class C | 30-45 | 132 |
| 4 | 20% Class A | 60-75 | 132 |
| 5 | 20% Class H | 60-75 | 132 |
| 6 | 20% Class H | 30 | 132 |
| 7 | 30% Class D 16.7% Class F 2.2% Class G | 30 | 132 |
| 8 | 20% Class A | 30 | 132 |
| 9 | 30% Class D 16.7% Class F 2.2% Class G | 30 | 132 |
| 10 | 10% Class A | 60-75 | 132 |
| 11 | 15% Class A | 30 | 132 |
| 12 | 20% Class D 16.7% Class F 2.2% Class G | 30 | 132 |
| 13 | 15% Class H | 30 | 132 |
| 14 | 20% Class A | 60 | 132 |
| 15 | 20% Class H | 30 | 132 |

TABLE 15

Particle size distribution

| | Initial Measurements (μm) | | | | Final Measurements (μm) | | | |
|---|---|---|---|---|---|---|---|---|
| Sample | D90 | D50 | D10 | Avg Particle Size | D90 | D50 | D10 | Avg Particle Size |
| 1 | 5.56 | 2.45 | 0.77 | 2.88 | 5.83 | 2.49 | 0.76 | 2.98 |
| 2 | 6.3 | 2.93 | 0.92 | 3.34 | 6.02 | 2.9 | 0.94 | 3.25 |
| 3 | 5.08 | 3.37 | 1.98 | 3.47 | 8.7 | 4.92 | 2.34 | 5.27 |
| 4 | 7.18 | 4.58 | 2.66 | 4.78 | 6.7 | 4.37 | 2.6 | 4.55 |
| 5 | 6.3 | 2.88 | 0.75 | 3.27 | 7.06 | 2.99 | 0.77 | 3.54 |
| 6 | 5.81 | 2.77 | 0.93 | 3.14 | 5.66 | 2.75 | 0.92 | 3.08 |
| 7 | 4.02 | 2.1 | 0.88 | 2.31 | 4.47 | 2.6 | 1.15 | 2.73 |
| 8 | 5.42 | 2.8 | 0.89 | 3.03 | 5.76 | 2.91 | 0.86 | 3.17 |
| 9 | 5.68 | 2.78 | 0.88 | 3.09 | 7.46 | 3.23 | 0.85 | 3.79 |
| 10 | 8.6 | 3.67 | 0.77 | 4.29 | 8.06 | 3.57 | 0.77 | 4.08 |
| 11 | 6.35 | 3.11 | 0.85 | 3.42 | 5.99 | 3.07 | 0.87 | 3.31 |
| 12 | 8.37 | 3.4 | 0.91 | 4.12 | 7.88 | 3.19 | 0.91 | 3.91 |
| 13 | 6.33 | 2.95 | 0.94 | 3.36 | 6.37 | 3.03 | 0.97 | 3.42 |
| 14 | 5.51 | 2.86 | 0.87 | 3.07 | 5.7 | 2.8 | 0.82 | 3.1 |
| 15 | 5 | 2.75 | 1.1 | 2.93 | 5.18 | 2.82 | 1.1 | 3.02 |

With the exception of Sample 3, the various dispersions do not have an appreciable difference in size after settling and resuspending compared to initially, as shown above in Table 15. This indicates aggregates are not forming during settling which would otherwise lead to inconsistencies in subsequent particle coating.

TABLE 16

Viscosity

| | Avg. Minimum Viscosity (cP) | |
|---|---|---|
| Sample | Initial | Final |
| 1 | 247.28 | 239.22 |
| 2 | 244.36 | 343.14 |
| 3 | N/A | 797.13 |
| 4 | N/A | 398.18 |
| 5 | 88.17 | 359.43 |
| 6 | 94.17 | 172.4 |
| 7 | 388.24 | 379.54 |
| 8 | 180.44 | 326.625 |
| 9 | 84.88 | 97.2175 |
| 10 | 92.24 | 54.87 |
| 11 | 122.91 | 74.42 |
| 12 | 306.59 | 155.7 |
| 13 | 97.4 | 151.6 |
| 14 | 315 | 275.16 |
| 15 | 344.63 | 284.73 |

TABLE 17

Settling & resuspension

| Sample | Settled Portion (oz) | Unsettled Portion (oz) | Percent of Unsettled Portion (%) | Resuspension Time (min) |
|---|---|---|---|---|
| 1 | 2.55 | 0.35 | 12.07 | ~1 |
| 2 | 1.75 | 1 | 36.36 | ~2 |
| 3 | 1.5 | 0.3 | 16.67 | ~3 |
| 4 | 1.75 | 0.1 | 5.41 | ~8 |
| 5 | 1.6 | 0.05 | 3.03 | ~1 |
| 6 | 2.3 | 0.75 | 24.59 | ~1 |
| 7 | 2.05 | 0.45 | 18 | ~1 |
| 8 | 2.2 | 0.5 | 18.52 | ~1 |
| 9 | 3 | 0.6 | 16.67 | ~1 |
| 10 | 2.05 | 0.1 | 4.65 | ~1 |
| 11 | 2.25 | 0.75 | 25 | ~1 |
| 12 | 1.2 | 1.55 | 56.36 | ~1 |
| 13 | 2 | 1.2 | 37.5 | ~1 |
| 14 | 2.75 | 0 | 0.0 | ~1 |
| 15 | 2.7 | 0.2 | 6.9 | ~1 |

The data in the Tables 16 and 17 provide examples of dispersions with varying but acceptable levels of viscosity and settling. The examples where settling was minimal and/or where resuspension occurs in about 1 minute are preferable, subject to meeting other criteria for the dispersion.

The data in Tables 15, 16, and 17 present evaluation parameters of the dispersions of Table 14. The dispersions and their creation can be ranked based on the particular data available. Passing all criteria is considered a best ranking. Passing all but one criteria is considered a better ranking while failing two or more criteria is considered a poor ranking. These parameters are provided in Table 18 below.

TABLE 18

| Ranking | Viscosity Range (Initial) cP | Viscosity Range (Final) cP | Viscosity Consistency | Resuspension Time (min) | Milling Time (min) |
|---|---|---|---|---|---|
| Pass | ≥100 and ≤375 | ≥100 and ≤375 | ≤20% deviation | ≤2 | ≤45 |
| Fail | <100 or >375 | <100 or >375 | >20% deviation | >2 | >45 |

The viscosity consistency is the deviation (increase or decrease) in viscosity from the initial grind to the post-settling resuspension. The milling time is the time necessary to achieve both a D90<10 μm and a D50<5 μm.

Since many modifications, variations and changes in detail can be made to the described preferred embodiments, it is intended that all matters in the foregoing description and shown in the accompanying drawings be interpreted as illustrative and not in a limiting sense. Thus, the scope of the invention should be determined by the appended claims and their legal equivalents. Now that the invention has been described,

What is claimed is:

1. A dispersion of coal tar pitch, comprising:
   55% by weight or less coal tar pitch having a softening point in the range of 100° C.-200° C.;
   60% by weight or less dispersant being at least one of a cationic surfactant, anionic surfactant, non-ionic surfactant, zwitterionic surfactant, polymeric, co-polymeric, surface-active substance and non-surface active polymer;
   a solvent selected from the group consisting of at least one of water, non-aromatic alcohol, aliphatic alcohol, polar solvent, inorganic solvent and aliphatic organic solvent; and
   wherein said dispersion has a particle size distribution of D50<15 μm of said coal tar pitch.

2. The dispersion as recited in claim 1, wherein said dispersion comprises 28-50% by weight coal tar pitch, 8.25-15% by weight dispersant, and a balance said solvent.

3. The dispersion as recited in claim 1, wherein said coal tar pitch has a softening point in the range of 110° C. to 155° C.

4. The dispersion as recited in claim 1, wherein said dispersant is selected from the group consisting of:

| Class | Description |
| --- | --- |
| A | APE-free aqueous general use dispersant (40-100% active) |
| B | Aqueous general use dispersant (40-100% active) |
| C | High performance carbon black dispersant |
| D | Organic general use dispersant (40-100% active) |
| E | Waterborne anionic dispersant agent |
| F | Waterborne non-ionic dispersant containing alcohol ethoxylate |
| G | Defoamer containing tetramethyldecynediol |
| H | Polymeric dispersant. |

5. The dispersion as recited in claim 1, wherein said dispersion has a particle size distribution of D50 selected from the group consisting of <9 μm and <5 μm of said coal tar pitch, and a D90 selected from the group consisting of <19 μm of said coal tar pitch and <10 μm of said coal tar pitch.

6. The dispersion as recited in claim 1, wherein said dispersion forming an unsettled portion being less than 60% of said dispersion upon settling for 28 days.

7. The dispersion as recited in claim 6, wherein said dispersion forming a settled portion capable of being resuspended in a time selected from the group consisting of less than 8 minutes at agitation speeds in the range of 600 to 700 cycles per minute; less than or equal to 2 minutes at agitation speeds in the range of 600 to 700 cycles per minute; and in the range of 1 to 3 minutes at agitation of about 700 cycles per minute.

8. The dispersion as recited in claim 7, wherein said dispersion has a viscosity in the range of 100 to 375 cP and a consistency of up to 20% deviation in viscosity before and after said settled portion is resuspended.

9. The dispersion as recited in claim 1, wherein said dispersion is capable of creating coated particles having an increased tap density compared to uncoated particles.

10. The dispersion as recited in claim 9, wherein said dispersion is capable of creating coated particles having an increased tap density selected from the group consisting of in the range of 10% to 30% compared to uncoated particles; in the range of 10% to 15% compared to uncoated particles; in the range of 20% to 25% compared to uncoated particles.

11. The dispersion as recited in claim 1, wherein said dispersion is capable of creating coated particles having a BET surface area of less than 8 $m^2/g$.

12. The dispersion as recited in claim 11, wherein said dispersion is capable of creating coated particles having a BET surface area selected from the group consisting of less than 5 $m^2/g$ and less than 3 $m^2/g$.

13. The dispersion as recited in claim 1, wherein said dispersion is capable of producing a battery having a charge capacity in the range of 360-372 mAh/g in the first cycle.

14. The dispersion as recited in claim 1, wherein said dispersion is capable of producing a battery having an irreversible capacity loss of 7% or less in a first cycle.

15. The dispersion as recited in claim 1, wherein said softening point of said coal tar pitch is at least 125° C.

16. The dispersion as recited in claim 1, wherein said dispersion comprises 28-50% by weight coal tar pitch and 8.25-15% by weight dispersant.

17. The dispersion as recited in claim 1, wherein said dispersion has a particle size distribution D50<10 μm of said coal tar pitch.

18. The dispersion as recited in claim 1, said coal tar pitch is micronized.

19. A method of making a dispersion of pitch particles, said method comprising:
   combining an amount of coal tar pitch particles with an aqueous solvent sufficient to achieve a concentration of 55% by weight or less coal tar pitch particles in said dispersion;
   adding an amount of dispersant to said coal tar pitch particles sufficient to achieve a concentration of 60% by weight or less dispersant in said dispersion to form a mixture; and
   milling the mixture of said coal tar pitch particles and said dispersant until said coal tar pitch reaches a particle size distribution of D50<15 μm in said dispersion.

20. The method as recited in claim 19, wherein combining an amount of said coal tar pitch particles further comprises combining an amount of said coal tar pitch particles sufficient to achieve a concentration selected from the group consisting of in the range of 28% to 50% by weight of said coal tar pitch particles in said dispersion; 28% by weight of said coal tar pitch particles in said dispersion; 30% by weight of said coal tar pitch particles in said dispersion; 35% by weight of said coal tar pitch particles in said dispersion; and 50% by weight of said coal tar pitch particles in said dispersion.

21. The method as recited in claim 19, wherein adding an amount of said dispersant further comprises adding an amount of said dispersant sufficient to achieve a concentration selected from the group consisting of in the range of 8.25% to 15% by weight of said dispersant in said dispersion; 8.25% by weight of said dispersant in said dispersion; 10% by weight of said dispersant in said dispersion; 13% by weight of said dispersant in said dispersion; and 15% by weight of said dispersant in said dispersion.

22. The method as recited in claim 19, wherein milling the mixture further comprises milling the mixture for a time selected from the group consisting of 30 to 400 minutes; 30 to 135 minutes; 30 to 75 minutes; 30 to 45 minutes; 60 to 75 minutes; and up to 45 minutes.

23. The method as recited in claim 19, wherein milling the mixture of said coal tar pitch particles and said dispersant occurs in the presence of said aqueous solvent.

24. The method as recited in claim 19, wherein milling the mixture of said coal tar pitch particles and said dispersant occurs in the absence of said aqueous solvent.

25. A method of applying a dispersion of coal tar pitch to graphitic material, comprising:
combining an amount of a dispersion as recited in claim 1 to an amount of graphitic material in a ratio in the range of 5% to 30% pitch to graphitic material;
mixing said dispersion and said graphitic material to achieve a mixture;
drying said mixture to remove said solvent and contact said coal tar pitch particles with said graphitic material;
carbonizing at temperatures in the range of 1000° C. to 1650° C. to adhere said coal tar pitch particles to a surface of said graphitic material.

26. The method as recited in claim 25, wherein combining an amount of said dispersion further comprises combining an amount of said dispersion as recited in claim 1 to an amount of said graphitic material in a ratio selected from the group consisting of in the range of 7% to 28% pitch to graphitic material; in the range of 10% to 20% pitch to graphitic material; 8% pitch to graphitic material; 11% pitch to graphitic material; 12% pitch to graphitic material; 14% pitch to graphitic material; 15% pitch to graphitic material; 16% pitch to graphitic material; 18% pitch to graphitic material; and 28% pitch to graphitic material.

27. The method as recited in claim 25, wherein carbonizing occurs at a temperature selected from the group consisting of about 1100° C. and about 1450° C.

28. The method as recited in claim 25, wherein said graphitic material is selected from the group consisting of natural graphite and synthetic graphite.

29. The method as recited in claim 25, wherein a shape of said graphitic material shape-is selected from the group consisting of spherical, spheroidal, ellipsoid and oblong.

30. The method as recited in claim 25, wherein said graphitic material is of a size selected from the group consisting of in the range of 5 to 20 microns; in the range of 5 to 7 microns;
in the range of 7 to 12 microns; in the range of 10 to 20 microns; and in the range of 10 to 12 microns.

31. Coated particles produced by the method of claim 25.

32. The coated particles as recited in claim 31, wherein said dispersion is selected from the group consisting of 28-50% by weight coal tar pitch, 8.25-15% by weight dispersant, and a balance said solvent; 35% by weight coal tar pitch, 10% by weight dispersant and a balance said solvent; 28% by weight coal tar pitch, 8.25% by weight dispersant and a balance said solvent; 50% by weight coal tar pitch, 13% by weight dispersant, and a balance said solvent; and 50% by weight coal tar pitch, 15% by weight dispersant, and a balance said solvent.

33. The coated particles as recited in claim 31, wherein said coal tar pitch of said dispersion has a softening point selected from the group consisting of in the range of 110° C. to 155° C.; 125° C.; 126.5° C.; 130° C.; and 132° C.

34. The coated particles as recited in claim 31, wherein said dispersion comprises a particle size distribution of D50 selected from the group consisting of <9 μm of said coal tar pitch and <5 μm of said coal tar pitch, and a D90 selected from the group consisting of <19 μm of said coal tar pitch and <10 μm of said coal tar pitch.

35. The coated particles as recited in claim 31, further comprising a composition selected from the group consisting of a range of 7% to 28% pitch to graphitic material; range of 10% to 20% pitch to graphitic material; 8% pitch to graphitic material; 11% pitch to graphitic material; 12% pitch to graphitic material; 14% pitch to graphitic material; 15% pitch to graphitic material; 16% pitch to graphitic material; 18% pitch to graphitic material; and 28% pitch to graphitic material.

36. The coated particles as recited in claim 31, wherein said coated particles have a BET surface area selected from the group consisting of less than 8 $m^2/g$; less than 5 $m^2/g$; and less than 3 $m^2/g$.

37. The coated particles as recited in claim 31, wherein said coated particles have an increased tap density compared to uncoated graphitic material.

38. The coated particles as recited in claim 31, wherein said coated particles have an increased tap density selected from the group consisting of in the range of 10% to 30% compared to uncoated particles; in the range of 10%-15% compared to uncoated particles; and in the range of 20% to 25% compared to uncoated particles.

39. The coated particles as recited in claim 31, wherein said coated particles are capable of producing battery having charge capacity in the range of 360-372 mAh/g in a first cycle.

40. The coated particles as recited in claim 31, wherein said coated particles are capable of producing battery having irreversible capacity loss of 7% or less in a first cycle.

* * * * *